United States Patent [19]
Goto et al.

[11] Patent Number: 5,694,245
[45] Date of Patent: Dec. 2, 1997

[54] PROJECTOR WITH IMPROVED SCREEN

[75] Inventors: Takeshi Goto; Toshihiro Suzuki; Tetsuya Kabayashi, all of Kawasaki, Japan

[73] Assignee: Fujitsu Limited, Kawasaki, Japan

[21] Appl. No.: 598,678

[22] Filed: Feb. 8, 1996

[30] Foreign Application Priority Data

Jun. 9, 1995 [JP] Japan ................... 7-143500

[51] Int. Cl.$^6$ ................................. G03B 21/28
[52] U.S. Cl. ................ 359/460; 359/443; 359/453; 359/455; 348/794; 353/74; 353/98
[58] Field of Search ................ 353/74, 77, 78, 353/98; 348/794; 359/75, 76, 77, 78, 79, 443, 453, 455, 456, 460

[56] References Cited

U.S. PATENT DOCUMENTS

| | | |
|---|---|---|
| 5,048,949 | 9/1991 | Sato et al. . |
| 5,278,595 | 1/1994 | Nishida et al. . |
| 5,379,080 | 1/1995 | Onozuka . |
| 5,506,642 | 4/1996 | Suzuhi et al. ............... 353/74 |
| 5,523,128 | 6/1996 | Hoh et al. ............... 359/75 |

*Primary Examiner*—Daniel P. Malley
*Attorney, Agent, or Firm*—Greer, Burns & Crain, Ltd.

[57] ABSTRACT

A projector comprising liquid crystal display panels and a projection lens for projecting the modulated light to a screen. The screen includes a transparent plastic member formed as a lenticular lens. The transparent plastic member has optical anisotropy. In order to eliminate an uneven pattern appearing in the screen caused by optical anisotropy and the difference between the light distribution characteristics in the screen for P- and S-polarized lights, the screen is arranged relative to the projection lens such that an arbitrary light component projected by the projection lens and made incident to the screen is not parallel to the optical axis of the plastic member.

34 Claims, 22 Drawing Sheets

PROJECTOR WITH IMPROVED SCREEN

BACKGROUND OF THE INVENTION

1. Field of the Invention

The present invention relates to a projector which includes space modulation elements such as liquid crystal display panels for producing a modulated light and a projection lens for projecting the modulated light onto a screen for producing an image thereon.

2. Description of the Related Art

Projectors can be classified into front surface type projectors and rear surface type projectors. In the front surface type projector, a reflective type screen is located on a vertical wall in a room, and a projection unit, including liquid crystal display panels and a projection lens, is arranged at the center in the room, whereby the modulated light is projected by the projection lens onto the screen for producing an image thereon. Observers see the light reflected from the screen as an image. On contrast, in the rear surface type projector, a projection unit including liquid crystal display panels and a projection lens is arranged in the projector casing, and a light transmitting type screen is arranged on the front of the projector casing. Observers can see the modulated light which has passed through the screen.

A rear surface type projector having a larger screen, such as a screen with diagonal dimension in the range from 70 to 100 inches, has recently been developed. In the larger rear surface type projector, it is necessary that the distance between the projection lens and the screen is extended to, for example, 2.5 to 5 meters, and the projector casing must be enlarged. Accordingly, it has been proposed to arrange a mirror between the projection lens and the screen to reduce the depth of the projector casing.

Conventionally, a front surface reflection mirror, made from glass, is arranged between the projection lens and the screen. If a mirror is to be used for the above described purpose in a rear surface type projector having a screen having a diagonal dimension in the range from 70 to 100 inches, the size of the mirror will be, for example, 1.5 m×1.1 m. If such a large mirror is made from glass, the thickness of glass should be greater than 5 millimeters since glass is brittle and fragile. The weight of the mirror, which will be more than 20 kilogram, becomes a problem. In addition, the mirror is mounted to the projector frame by mirror holders, but the mirror holders must be also strong and heavy. Accordingly, the weight of the mirror assembly may be 20 kilogram to 50 kilogram, and the weight of the entire projector may be more than 100 kilogram.

Accordingly, it has been conceived to make the mirror arranged between the projection lens and the screen from a plastic sheet which can be made thin and light because plastic is elastic and not brittle and because the specific weight of plastic is approximately 60 percent of the specific weight of glass.

The inventors have attempted to make a mirror from a transparent plastic sheet. The mirror was a back surface reflection mirror including a transparent plastic sheet and a reflecting film superposed on the plastic sheet. The light projected by the projection lens was made incident to the plastic sheet, was reflected by the reflecting film located on the back surface of the plastic sheet, and emerged from the plastic sheet. It was possible to reduce the thickness of the mirror to 100 μm or less by which the mirror is not damaged, and accordingly the weight of the mirror can be considerably reduced.

However, it has been found that an uneven pattern or a fringe pattern appeared on the screen when a back surface reflection mirror including a transparent and thin plastic sheet and a reflecting film was used. Japanese Patent Application No. 6-314915, filed by the same assignee as for the present case, proposes to solve the problem of an uneven pattern appearing when the back surface reflection mirror.

A further problem arises with respect to the screen. That is, in the rear surface type projector, the screen is usually made from the combination of a fresnel lens and a lenticular lens, the lenticular lens including vertically extending (lenticular) parallel projections. When the screen is viewed in an arbitrary direction, a pattern of brightness and darkness appears depending on the pitch of the lenticular lens. Recently, the pitch of the pattern of brightness and darkness, i.e., the pitch of the lenticular lens, has been made approximately 1 mm, and if the screen is viewed at a position 2 meters away from the screen, such pattern of brightness and darkness cannot be be visually recognized.

However, when an image which is formed by dots is formed on the screen, repetition of brightness and darkness of picture elements interferes with repetition of brightness and darkness of the screen, and an interference pattern (hereinafter called a moire pattern) may be observed. The moire occurs depending on the ratio of the pitch of the picture elements to the pitch of the lenticular lens and the resolving power. In order to prevent an occurrence of moire, it is effective to sufficiently increase the ratio of the pitch of the picture elements to the pitch of the lenticular lens or to reduce resolving power of at least one of the picture elements and the screen.

However, a black stripe is usually applied to the surface of the lenticular lens, and it is difficult to reduce the resolving power of the pattern of brightness and darkness of the screen. Also, the reduction of resolving power of the picture elements means a reduction in the quality of the image and is not advisable. Therefore, in order to deal with moire, it is practical to control the ratio of the pitch of the picture elements to the pitch of the lenticular lens, and to this end, the pitch of the lenticular lens is mainly controlled since the pitch of the picture elements is fundamentally decided according to the size of the screen.

In the recently available double-sided lenticular lens, reduction of the pitch of the picture elements is restricted due to the relationship between the pitch and the thickness and a moulding technique, and the minimum pitch of the lenticular lens is, for example, 0.5 mm when the thickness of the acryl plate which is the basic material of the lenticular lens is 0.7 mm. In contrast to this, the pitch of the picture elements is 2.2 to 3.3 mm, when a VGA display (horizontally 640 elements and vertically 480 elements) is formed on the screen having the size of 70 to 80 inch. Therefore, the ratio of the pitch of the picture elements to the pitch of the lenticular lens is 4:1–6:1.

According to the simulation analysis, however, it has been found that the ratio of the pitch of the picture elements to the pitch of the lenticular lens is preferably greater than 7:1 since the resolving power of the liquid crystal projector is very good. To satisfy this, it is necessary that the pitch of the lenticular lens is smaller than 0.3 mm when the screen having the size of 70 to 80 inch is used. Also, in view of the recent development of information dealing machines, projectors having higher resolving power will be required, and it is necessary to further reduce the pitch of the lenticular lens.

There is a limit to reducing the pitch of the lenticular lens under a conventional manufacturing method in which the lenticular lens is fabricated by pressing an acryl plate. In order to fabricate a lenticular lens having a very small pitch, it is necessary to use a very thin and nonexpandable basic material. For example, a polyester film having the thickness of 35 μm is used for magnetic tapes or the like, and its nonexpandability is evidently known. Therefore, such polyester film may be appropriate in fabrication a lenticular lens having a very small pitch. The inventors tried to experimentally fabricate a screen by providing regular projections on a thin polyester film. This thin screen is lighter than a convention screen of an acryl plate and does not substantially deform when tension is applied entirely to the screen, so it can be attached to the projector casing as a rear surface screen.

However, when a linear polarized light is made incident to this screen, an undesirable rainbow-like pattern appeared.

SUMMARY OF THE INVENTION

The object of the present invention is to provide a projector by which an uneven pattern or a rainbow-like pattern, appearing on the screen, can be eliminated.

According to one aspect of the present invention, the above object is solved by a projector comprising a light source, at least one space modulation element arranged to receive the light from said light source for producing a modulated light, at least one projection lens arranged to receive the modulated light for projecting the latter, a screen arranged to receive the light projected by the projection lens for producing an image thereon, the screen having different characteristics for distributing light components perpendicularly polarized to each other, the screen including at least in part a transparent member having optical anisotropy and at least one optical axis, and wherein the screen is arranged such that an arbitrary light component of the light projected by the projection lens and passing through the transparent member of the screen is not parallel to the at least one optical axis of the transparent member.

According to another aspect of the present invention, the above object is solved by a projector comprising a light source, at least one space modulation element arranged to receive the light from said light source for producing a modulated light, at least one projection lens arranged to receive the modulated light for projecting the latter, a screen arranged to receive the light projected by the projection lens for producing an image thereon, the screen having different characteristics for distributing light components perpendicularly polarized to each other, the screen including at least in part a transparent member having optical anisotropy and at least one optical axis, and wherein there is the relationship of ΔPH<0.1 where R, G, and B in the following parentheses are representative of red, green and blue components, A(R), A(G), and A(B) are the amounts of the light projected onto the screen as a first polarized light, B(R), B(G), and B(B) are the amounts of the light projected onto the screen as a second polarized light perpendicular to the first polarized light, A(R)≧B(R), A(G)≧B(G), and A(B)≧B(B), G(R,p), G(G,p), and G(B,p) are the gains of the screen for a third polarized light, G(R,s), G(G,s), and G(B,s) are the gains of the screen for a fourth polarized light perpendicular to the third polarized light, G(R,p)≧G(R,s), G(G,p)≧G(G,s), and G(B,p)≧G(B,s), and $$\Delta(R)=|[A(R)\times G(R,p)+B(R)\times G(R,s)]-[A(R)\times G(R,s)+B(R)\times G(R,p)]|$$

$$\Delta(G)=|[A(G)\times G(G,p)+B(G)\times G(G,s)]-[A(G)\times G(G,s)+B(G)\times G(G,p)]|$$

$$\Delta(B)=|[A(B)\times G(B,p)+B(B)\times G(B,s)]-[A(B)\times G(B,s)+B(B)\times G(B,p)]|$$

$$\Delta PH=|\Delta(R)-\Delta(B)|+|\Delta(G)-\Delta(B)|$$

According to a further aspect of the present invention, the above object is solved by a projector comprising a light source, at least one space modulation element arranged to receive the light from said light source for producing a modulated light, at least one projection lens arranged to receive the modulated light for projecting the latter, a screen arranged to receive the light projected by the projection lens for producing an image thereon, the screen having a first light distribution characteristic for a vertical linearly polarized light and a second light distribution characteristic for a horizontal linearly polarized light, the first light distribution characteristic differing from the second light distribution characteristic, the screen including at least in part a transparent member having optical anisotropy and at least one optical axis, and wherein the light projected by the projection lens and made incident to the screen is a generally nonpolarized light defined by the relationship of $$(A\times P+B\times S) \leq 1.1(A\times S+B\times P)$$

where P and S are gains of the screen in the first and second light distribution characteristics at a particular distribution angle at which it is desired to obtain a clear image, with P≧S, and A and B are the amounts of the linearly polarized lights projected to the screen, with A≧B.

According to a still further aspect of the present invention, the above object is solved by a projector comprising a light source, at least one space modulation element arranged to receive the light from said light source for producing a modulated light, at least one projection lens arranged to receive the modulated light for projecting the latter, a screen arranged to receive the light projected by the projection lens for producing an image thereon, the screen having different characteristics for distributing light components perpendicularly polarized to each other, the screen including at least in part a transparent member having optical anisotropy and at least one optical axis, and wherein the modulated light diverging from substantially one point on the at least one space modulation element is in a generally regularly polarized state with respect to the diverging angle, and a polarized light converting element is provided for converting a generally regularly polarized light with respect to the diverging angle into an irregularly polarized light with respect to the diverging angle.

The inventors have found that an uneven pattern appears on the screen when the screen is made from a material having optical anisotropy and at least one optical axis and when the following conditions are combined; condition of polarization of light made incident to the mirror, a phase difference of polarized light occurring due to optical anisotropy of the transparent member in the screen, and different light distribution characteristics of the screen for P- and S-polarized light components. Accordingly, the above described solutions can eliminate an uneven pattern otherwise appearing in the screen, by adequately controlling the above described combination, in particular, by converting the condition of polarization of light made incident to the screen, reducing a phase difference of polarized light due to optical anisotropy of the transparent member in the screen, and reducing the difference in light distribution characteristics of the screen.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Basic Arrangement

Figure 1:
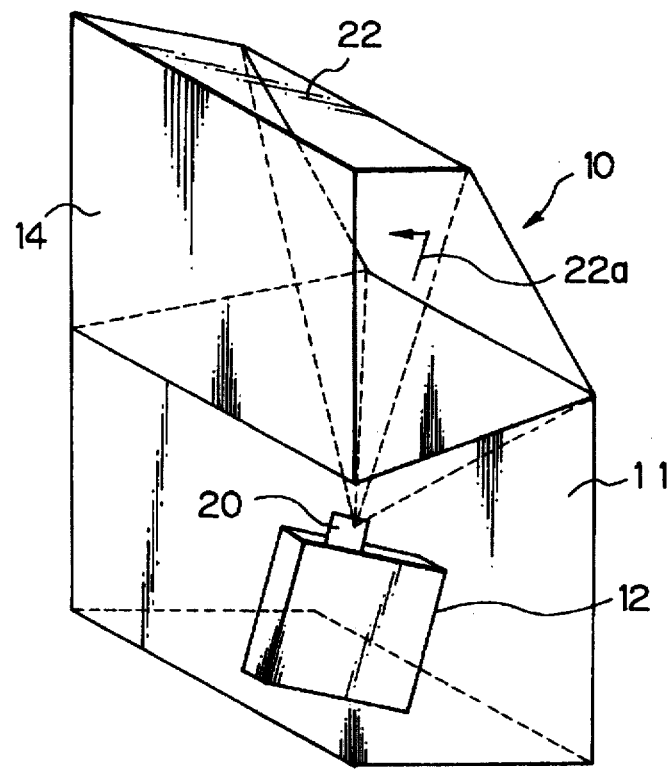
FIG. 1 is a simplified perspective view of the projector according to the present invention.
Figure 2:
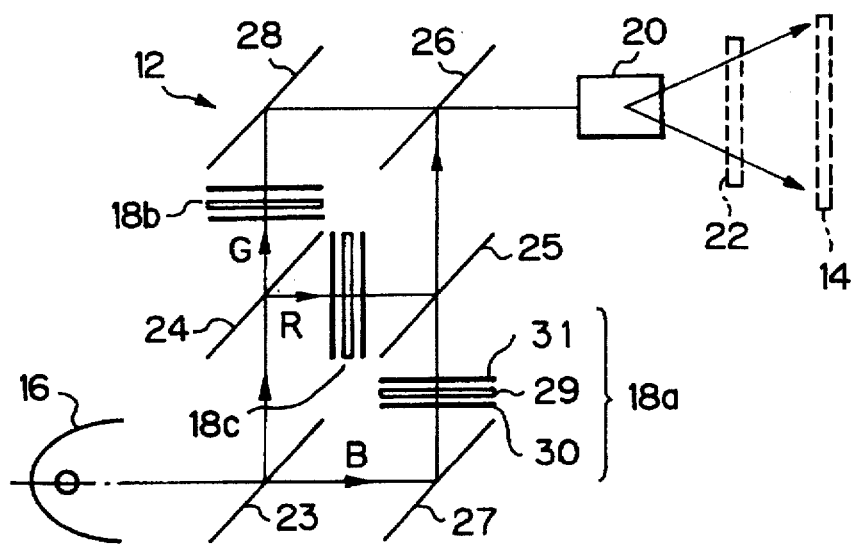
FIG. 2 is a view illustrating the components of the projection unit of FIG. 1.

FIGS. 1 and 2 show the rear surface type projector according to the first embodiment of the present invention. The projector 10 comprises a projector casing 11, a projection unit 12 arranged in the projector casing 11, and a transmitting type screen 14 arranged in the front of the projector casing 11. The projection unit 12 includes a light source 16, liquid crystal display elements 18a, 18b, and 18c as space modulation elements, and a projection lens 20. A mirror 22 is arranged between the projection lens 20 and the screen 14 to bend the light as shown by the arrow 22a in FIG. 1 so as to reduce the depth of the projector casing 11, compared with the case where the light travels straight from the projection lens 20 to the screen 14, as comparatively shown in FIG. 2.

In FIG. 2, the projection unit 12 also includes color separating dichroic mirrors 23 and 24, color combining dichroic mirrors 25 and 26, and total reflection mirrors 27 and 28. The light emitted from the light source 16 is separated by the color separation dichroic mirror 23 into a blue component B and the other color components. The blue component B is reflected by the total reflection mirror 27 to the liquid crystal display element 18a and further travels to the projection lens 20 via the color combinating dichroic mirrors 25 and 26. The color components other than the blue component B, which are reflected by the color separation dichroic mirror 23, are separated by the color separation dichroic mirror 24 into a red component G and a green component G. The red component G passes through the liquid crystal display element 18c and travels to the projection lens 20 via the color combinating dichroic mirrors 25 and 26. The green component G passes through the liquid crystal display element 18b and travels to the projection lens 20 via the total reflection lens 28 and the color combinating dichroic mirror 26.

Each liquid crystal display element 18a, 18b, or 18c comprises a liquid crystal panel 29 including a TN-type liquid crystal, a polarizer 30 and an analyzer 31. The polarizer 30 and the analyzer 31 have transmitting axes arranged mutually perpendicularly. Each liquid crystal display element 18a, 18b, or 18c receives the light from the light source 16 and produces modulated light depending on the applied voltage for producing an image. The projection lens 20 projects the modulated light passing through the liquid crystal display elements 18a, 18b and 18c onto the mirror 22 in order to project the modulated light to the screen 14. The light projected by the projection lens 20 diverges to produce a magnified image on the screen 14, as shown in FIG. 2.

Figure 3:
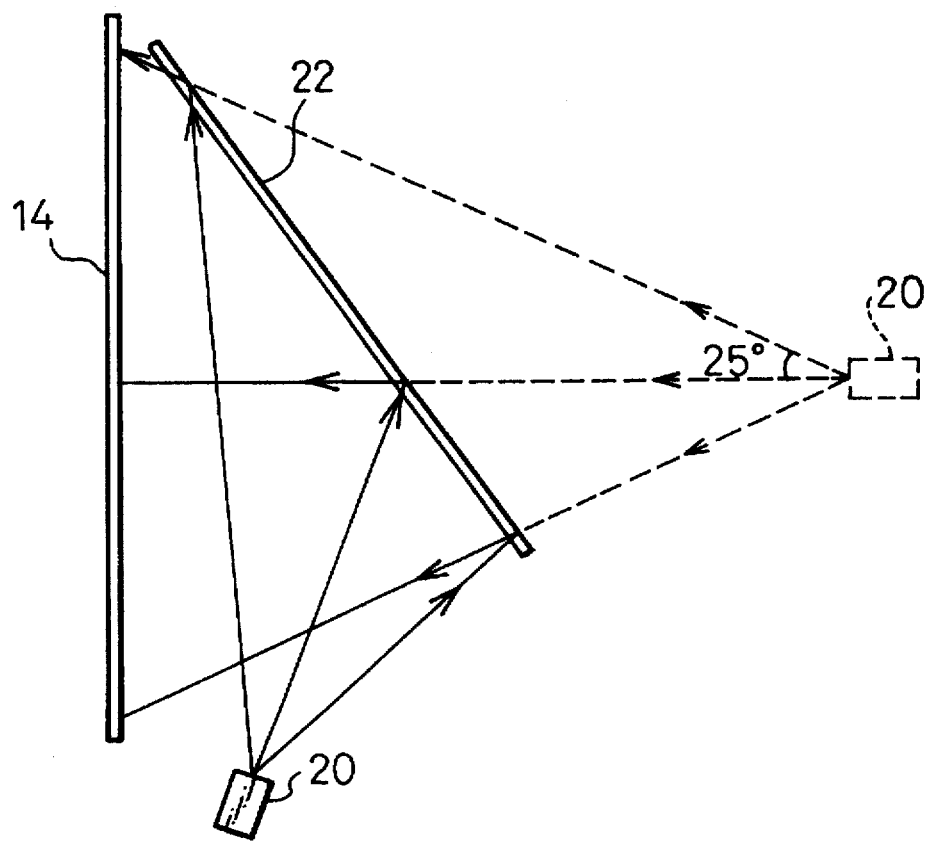
FIG. 3 is a view illustrating the relationship between the projection lens, the mirror and the screen, according to the disposition of FIG. 17.
Figure 4:
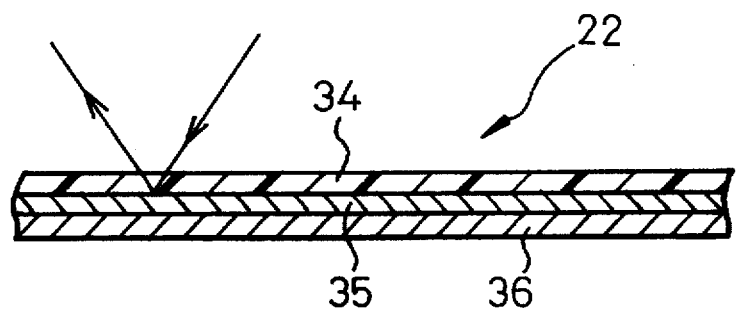
FIG. 4 is a cross-sectional view of a portion of the mirror.
Figure 5:
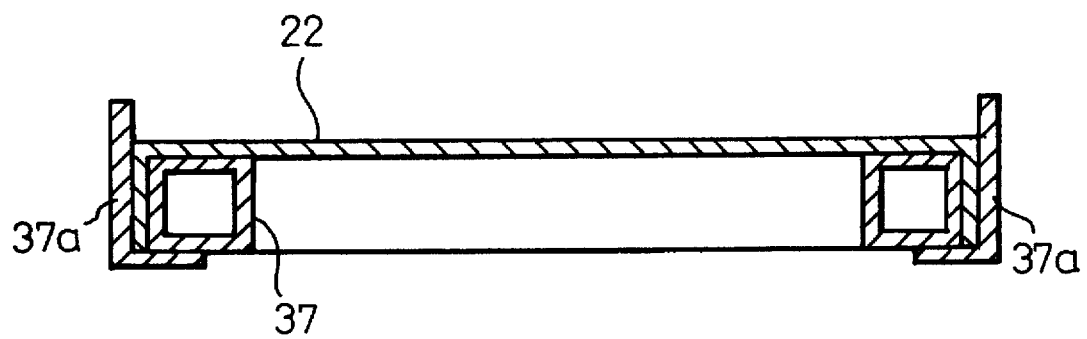
FIG. 5 is a cross-sectional view of the mirror attached to the mirror holder.

As shown in FIGS. 3 to 5, the mirror 22 comprises a back surface reflection mirror including a transparent plastic sheet 34 and a reflecting film 35 superposed on the plastic sheet 34. The light projected by the projection lens 20 is made incident to the plastic sheet 34, reflected by the reflecting film 35, and emerges from the plastic sheet 34, as shown by the arrow in FIG. 4. The mirror 22 is stretched on an annular, rectangular aluminum frame 37 and adhered to the side surfaces of the frame 37 after an appropriate tension is applied to maintain the mirror 22 in a flat condition. Mirror holders 37a are attached to the four corners of the frame 37. Each holder 37 is attached to the frame of the projector 10.

In the embodiment, the screen 14 has a diagonal dimension of 70 inch, and the size of the mirror 22 is 1,430 mm×1,100 mm. The plastic sheet 34 comprises a polyester sheet having the thickness in the range from 25 to 30 μm, and the reflecting film 35 comprises a metal such as silver or aluminum having the thickness of several thousand angstrom which is vapor-deposited on the plastic sheet 34. A protective film 36 of chromoxide or PMMA is also vapor-deposited on the film.

Figure 6:
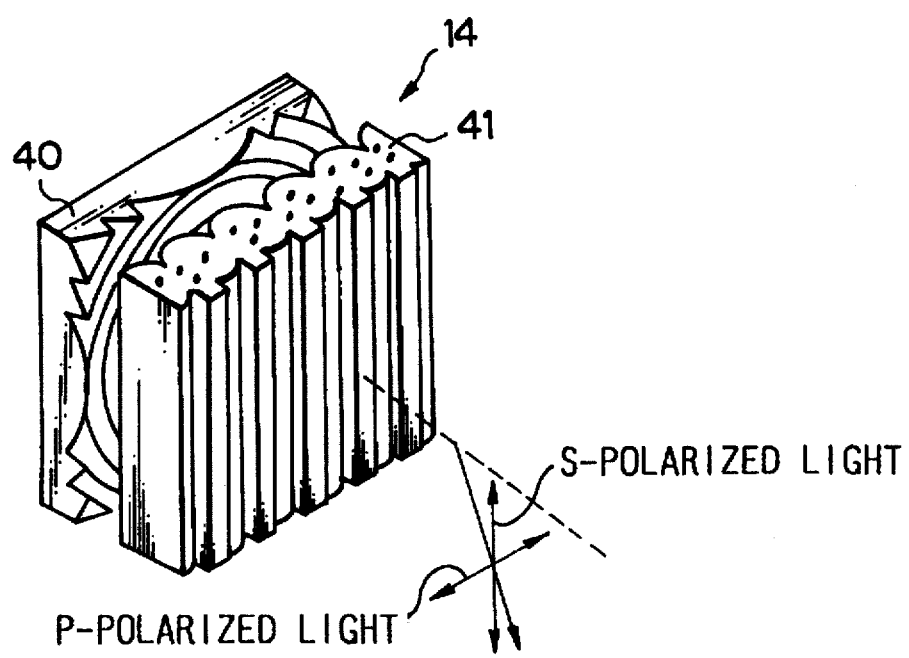
FIG. 6 is a diagrammatic perspective view of the screen of FIG. 1.

FIG. 6 shows the detailed structure of the transmitting type screen 14 used in the rear surface reflection projector 10. The screen 14 comprises the combination of a circular fresnel lens 40 and a double sided lenticular lens 41. The double sided lenticular lens 41 is made by the steps of making a simple diffusion plate in which diffusion particles such as small beads are mixed in the material and then presses into the simple diffusion plate so that peaks and valleys vertically extend on the surfaces of the plate. The fresnel lens 40 bends the divergent light from the projection lens 20 so that the light becomes parallel to the optical axis of the projection lens 20 or rather convergent in the vertical sense, so as to determine the vertical viewing angle. The lenticular lens 41 causes the light to be diffused by the diffusion particles and to be horizontally distributed by the oblique surfaces of vertical peaks and valleys of the lenticular lens 41 so that an observer can see the light impinging on any point on the screen 14 from any horizontal direction.

The lenticular lens 41 is made from a polyester film having the thickness of 25 to 30 μm onto which projections (lenticular) are formed by pressing or stamping. A polarized film (not shown) is arranged on an external surface of the lenticular lens 41, the polarized film having a transmission axis extending parallel to the direction of polarization of the incident light. The fresnal lens 40 can be made from an acryl resin in a conventional manner or from a polyester film. In addition, the lenticular lens 41 can be realized by providing the projections, as described above, or alternatively, the lenticular lens 41 can be realized as a flat sheet having a distribution of refractive index corresponding to and in place of the projections (lenticular). It is also possible to make the lenticular lens 41 and the fresnal lens 40 on either side of a single polyester film.

Figure 7:
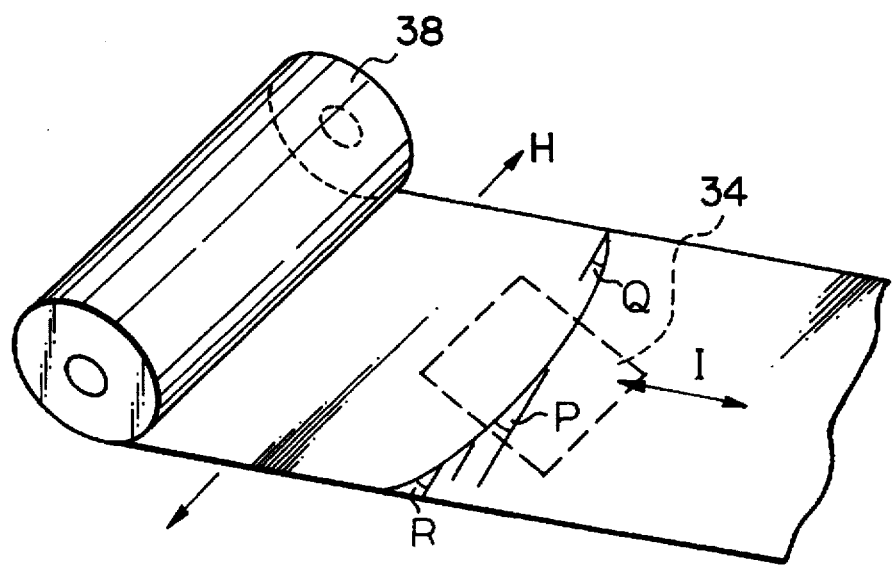
FIG. 7 is a perspective view of a roll of plastic sheet which is stretched to obtain the plastic sheet of the mirror or the transparent member of the screen.

FIG. 7 shows a polyester film for fabricating the plastic sheet 34 of the mirror 22 or the transparent member (for example, lenticular lens 41) of the screen 14. The polyester film is unwound from a roll 38, and is stretched in the longitudinal direction I and in the transverse direction H. The stretched polyester film has optical anisotropy and two optical axes. The optical axes usually exist in a plane which is perpendicular to the sheet of FIG. 7 and generally parallel to the transverse direction H, but a bowing phenomena occurs as illustrated by the curved line in FIG. 7. The optical axes exist on the curved line in FIG. 7. In FIG. 7, for example, the curved line forms the angle P. Q or R relative to the transverse direction H. Accordingly, the plastic sheet 34 of the mirror 22 or the transparent member of the screen 14 is obliquely cut from the stretched sheet so that one side of the severed polyester sheet is generally parallel to a portion of the curved line. However, the present invention is not limited to this arrangement. In addition, it is also possible to arrange the plastic sheet 34 such that the optical axis thereof is parallel to the plane of the sheet of FIG. 7, i.e., parallel to the surface of the plastic sheet 34 or the transparent member, depending on the manner of stretching.

Figure 8:
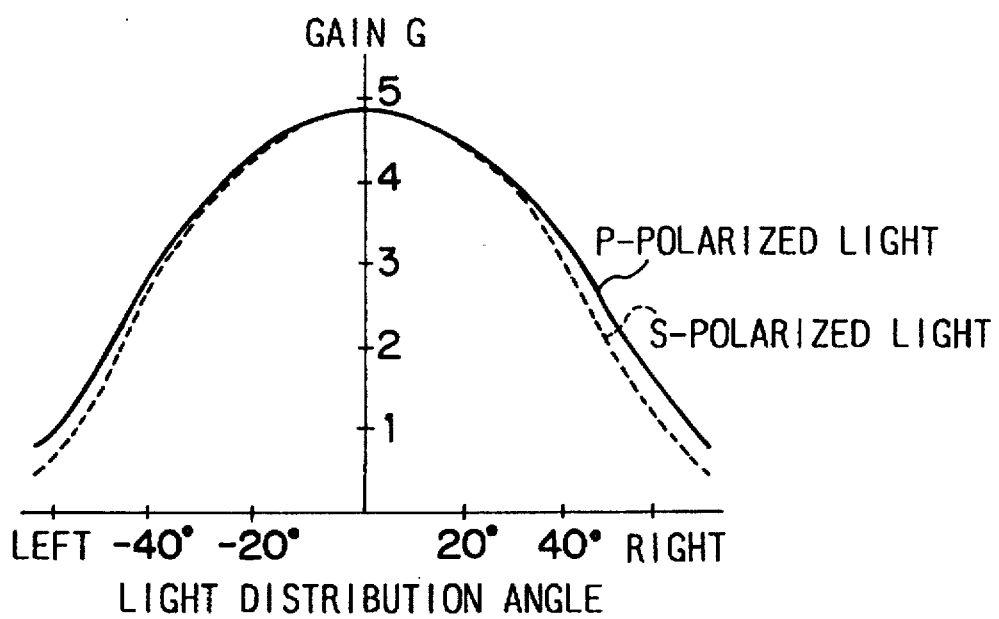
FIG. 8 is a view illustrating the light distribution characteristics of the screen of FIG. 6.

FIG. 8 shows the light distribution characteristics of this screen 14. The light distribution angle corresponds to the viewing angle relative to the normal of the screen 14 at which the screen is viewed. The gain in the normal direction (i.e., at the distribution angle=0) is approximately 5. It should be noted that, in FIG. 8, the light distribution characteristic of P-polarized light with respect to the screen 14 differs from that of S-polarized light. In particular, the difference between the light distribution characteristics of the P-polarized light and the S-polarized light becomes larger as the light distribution angle is greater, and particularly more than 30 or 40 degrees.

As shown in FIG. 6, the light refracts mainly in the horizontal direction when the light is incident to the lenticular lens 41, and thus the incident-refractive (reflective) plane extends horizontally. Accordingly, P-polarized light with respect to the surface of the lenticular lens 41 of the screen 14 is a linear polarized light having a horizontal plane, and S-polarized light is a linear polarized light having a vertical plane. The difference in the light distribution characteristics with respect to P- and S-polarized light is based on the known fact that the reflectivity of P-polarized light differs from that of S-polarized light.

Uneven Pattern

Figure 9:
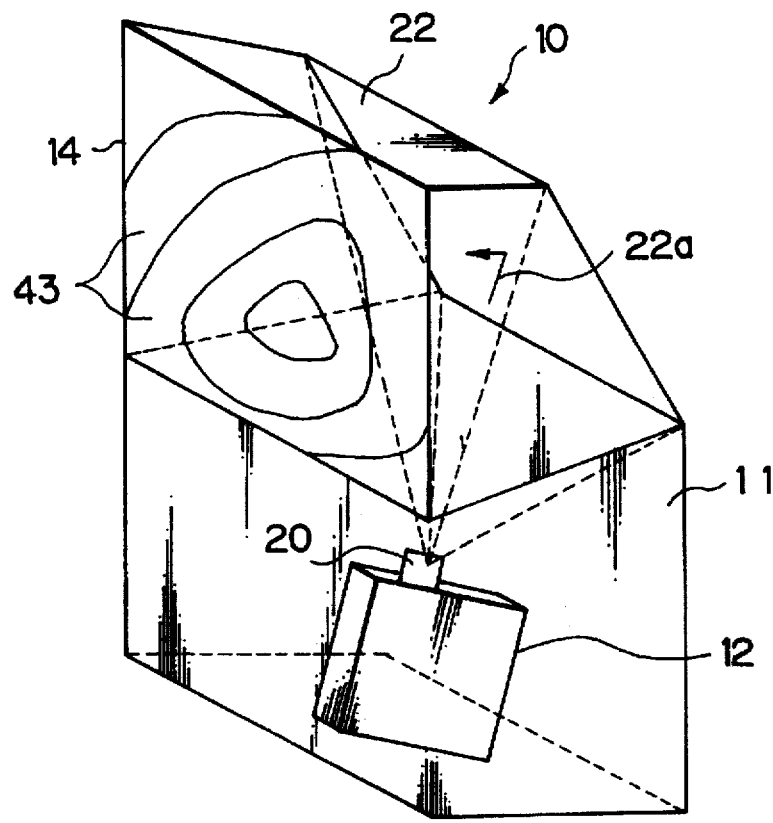
FIG. 9 is a view of the projector, similar to FIG. 1, but illustrating an uneven pattern appearing in the screen when the screen including the plastic sheet having optical anisotropy is used.

In the first attempt, a comparative projector similar to the projector 10 in FIG. 1 was manufactured without any special consideration, and an image on the screen 14 was observed. As a result, an uneven pattern 43 in the form of a fringe pattern appeared in the screen 14 at the viewing angle of 30 to 60 degrees, as shown in FIG. 9. Here, the lenticular lens 41 of the screen 14 is made from an acryl plate having optical isotropy, and the plastic sheet 34 of the mirror 22 is made from a polyester film having biaxial anisotropy.

The uneven pattern 43 was a brightness variation in the case of a monochromatic display and a color variation when the image is entirely white in the case of a color display. The variation of chromaticity is in the range of, for example, $0.2 \leq x \leq 0.5$, and $0.2 \leq y \leq 0.5$. When the mirror 22 was made from glass, such uneven pattern 43 did not appear. Accordingly, it is believed that the uneven pattern 43 appeared because the mirror 22 is made from the plastic sheet. Also, when the mirror 22 is made from glass and the lenticular lens 41 of the screen is made from a polyester film having optical anisotropy, an uneven pattern similar to the uneven pattern 43 appears.

The inventors thus started to study the mechanism by which the uneven pattern 43 appears on the screen 14, and discovered a way to eliminate the uneven pattern 43. The details are described below.

Figure 10:
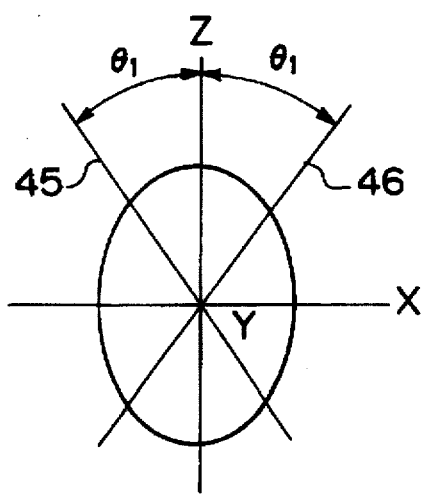
FIG. 10 is a diagrammatic view illustrating an ellipsoid of refractive index.

FIG. 10 shows a known ellipsoid of refractive index. In FIG. 10, the X-axis and the Z-axis extend in the plane of the sheet, and the Y-axis extends perpendicular to the plane of the sheet. In a body having optical anisotropy in which refractive indices in X-axis, Y-axis and Z-axis are different from each other, it is known that two optical axes 45 and 46 exist in the plane including X-axis and Z-axis and form the angle of $\pm\theta_1$ to the Z-axis. As is well known, the optical axis is defined such that when the light propagates in the direction of the optical axis, optical anisotropy does not appear and thus this condition seems isotropic. The optical behavior is described here with reference to the plastic sheet 34 of the mirror 22, but this can be also applied to the lenticular lens 41 (transparent member) of the screen 14.

Figure 11:
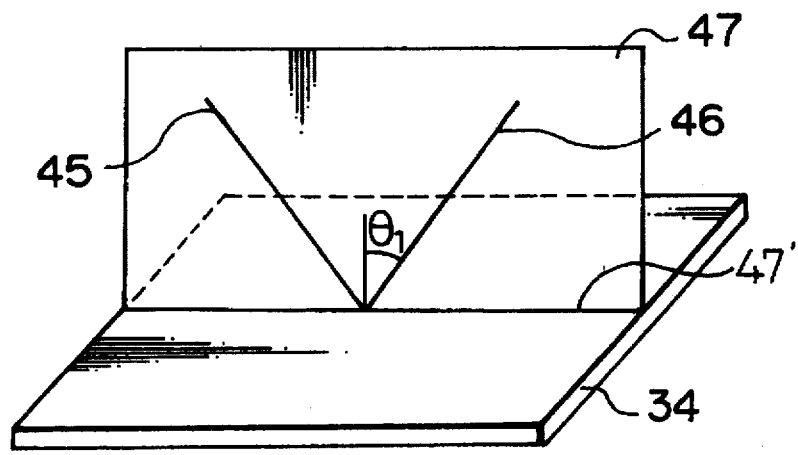
FIG. 11 is a diagrammatic view illustrating the relationship between the optical axis plane and the plastic sheet.

FIG. 11 shows that a plane (referred to as an optical axis plane) 47 containing the optical axes 45 and 46 of the plastic sheet 34 in the mirror 22 extends perpendicular to the surface of the plastic sheet 34. The plastic sheet 34 in the mirror 22 has an identical optical property to that of body of the ellipsoid of refractive index in FIG. 10. When the plastic sheet 34 in the mirror 22 comprises polycarbonate, the angle $\theta_1 = 90$ degrees. That is, the optical axis of the plastic sheet 34 is generally parallel to the surface of the plastic sheet 34. When the plastic sheet 34 in the mirror 22 comprises polyester having biaxial anisotropy, the angle $\theta_1$ is in the range from 20 to 40 degrees. The angle $\theta_1$ changes depending on the stretching condition. The angle $\theta_1$ was approximately 27 degrees when the sheet 34 is obtained in the manner described with reference to FIG. 7. When the plastic sheet 34 comprises a polycarbonate film having uniaxial anisotropy, the angle $\theta_1$ is 0 degree. That is, the optical axis of the plastic sheet 34 becomes parallel to the surface of the plastic sheet 34.

Figure 12:
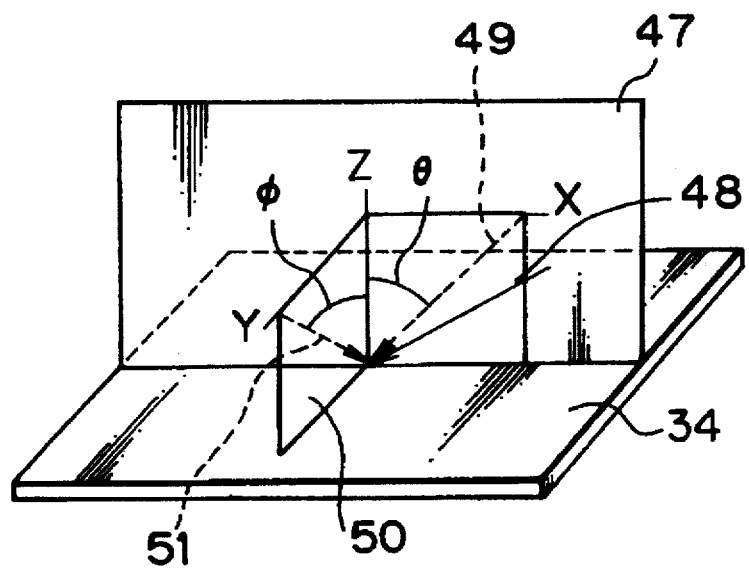
FIG. 12 is a diagrammatic view illustrating the definition of the incident angle to the plastic sheet.

FIG. 12 shows an arbitrary light 48 incident to and propagating in the plastic sheet 34 at an arbitrary angle. Here, the angle between the projection 49 of the incident light 48 on the optical axis plane 47 in the plastic sheet 34 and Z-axis is "$\theta$", and the angle between the projection 51 of the incident light 48 on the plane 50 perpendicular to the optical axis plane 47 and extending in the Y-axis direction and Z-axis is "$\phi$". That is, the incident angle in the plastic sheet 34 is defined by $\theta$ and $\phi$.

The linear polarized light incident to the plastic sheet 34 in the mirror 22 at an arbitrary angle is separated into one component vibrating in the slow axis direction and another component vibrating in the fast axis direction. Two components are reflected by the reflection film 35, and again pass through the plastic sheet 34. When two components emerge from the plastic sheet 34, they become a single polarized light beam having a phase which is different from that of the incident polarized light.

Figure 13:
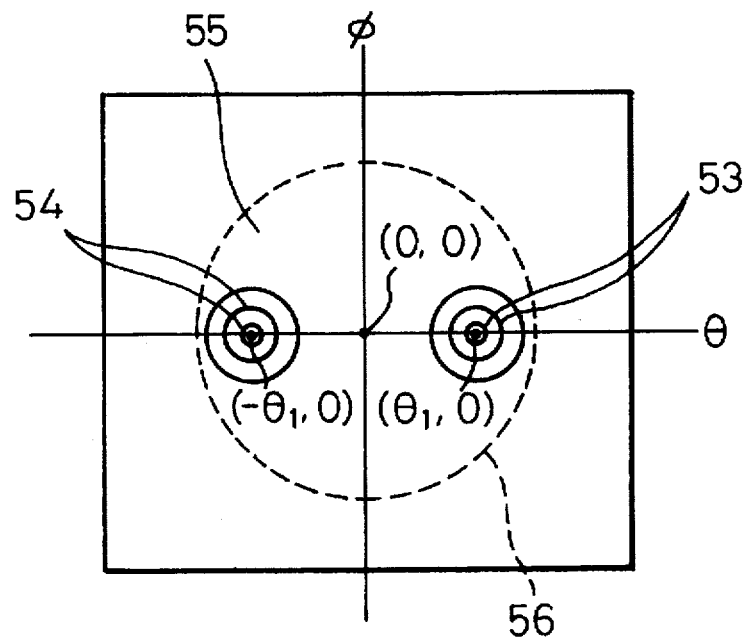
FIG. 13 is a view illustrating the phase distribution of the polarized light emerging from the mirror.

FIG. 13 shows the result of the study of the phase difference between the incident polarized light to the plastic sheet 34 and the emerging polarized light from the plastic sheet 34 when the linear polarized light is made incident to the plastic sheet 34 in the mirror 22 at various arbitrary angles and emerges from the plastic sheet 34 (i.e., the mirror 22) after the reflection by the reflection film 35. The horizontal axis is the angle $\theta$ and the vertical axis is the angle $\phi$. The greater the angle $\theta$, the greater the incident angle along the optical axis plane 47, and the greater the angle $\phi$, the greater the incident angle along the plane 50 perpendicular to the optical axis plane 47.

In FIG. 13, two groups of substantially concentric isophase-difference lines 53 and 54 are formed about a point $(\theta_1, 0)$ and about a point $(-\theta_1, 0)$ where the incident angle of the polarized light is parallel to the optical axes 45 and 46, respectively. The iso-phase-difference lines 53 and 54 are arranged in a dense arrangement about the respective points $(\theta_1, 0)$ and $(-\theta_1, 0)$. There is an isophase-difference region 55 between the regions of the isophase-difference lines 53 and 54. The isophase-difference line is a continuity of points at which phases (or polarization states) of the emerging polarized light beams are identical to each other, when polarized light beams in a uniform polarization state are incident to the plastic sheet 34 and polarized light beams emerging from the plastic sheet 34 after reflection by the mirror surface may have different phases (or polarization states) from that of the incident polarized light beams. In addition, the phase difference changes depending on the wavelength of the incident light, and if white light is supplied, the state of polarization changes for red, green and blue light components.

A total reflection boundary line 56 also exists, encircling two groups of iso-phase-difference lines 53 and 54. That is, the light, which is made incident to and propagates through the plastic sheet 34 at an angle located outside the total reflection boundary line 56, and reflected by the reflection film 35, cannot emerge from the plastic sheet 34. Therefore, the light, which is made incident to the mirror 22 at an angle corresponding to one located outside the total reflection boundary line 56, cannot be used. However, in the case of the lenticular lens 41 of the screen 14, there is no problem regarding a total reflection, since the lenticular exists on the exterior side thereof.

Figure 14:
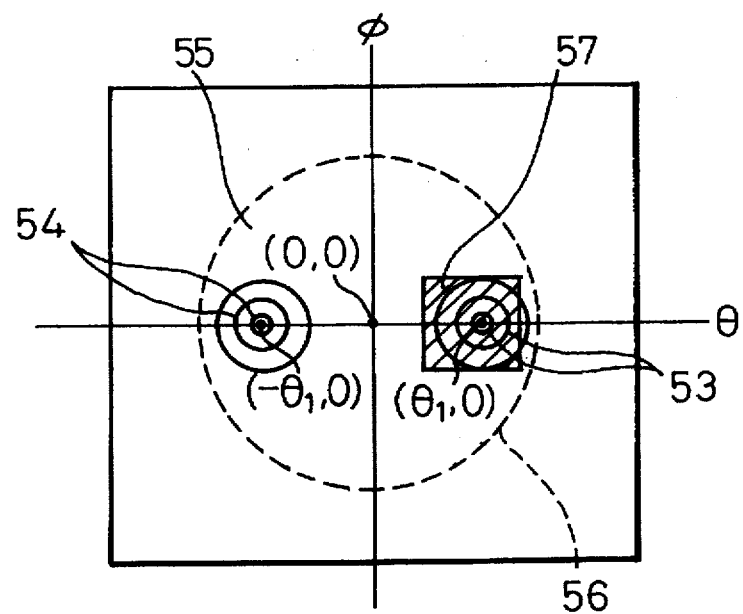
FIG. 14 is a view illustrating the area of the incident light in which the uneven pattern of FIG. 9 appears.

In the projector presenting the uneven pattern 43 of FIG. 9, the projection lens 20 and the mirror 22 were arranged in such a relationship that the incident angles of the light projected by the projection lens 20 and propagating through the plastic sheet 34 of the mirror 22 are within the region 57 in FIG. 14. The divergent light is projected by the projection lens 20, and the divergent light includes a component travelling along the optical axis of the projection lens 20 and components travelling at various angles relative to the optical axis of the projection lens 20. That is, the light is incident to the mirror 22 at various incident angles within the region 57 of FIG. 14. The center of the region 57 is the point $(\theta_1, 0)$, and a component of the light travelling along the optical axis of the projection lens 20 is parallel to the optical axis 46 of the plastic sheet 34. This region 57 includes the area of the dense isophase-difference lines 53.

Figure 15:
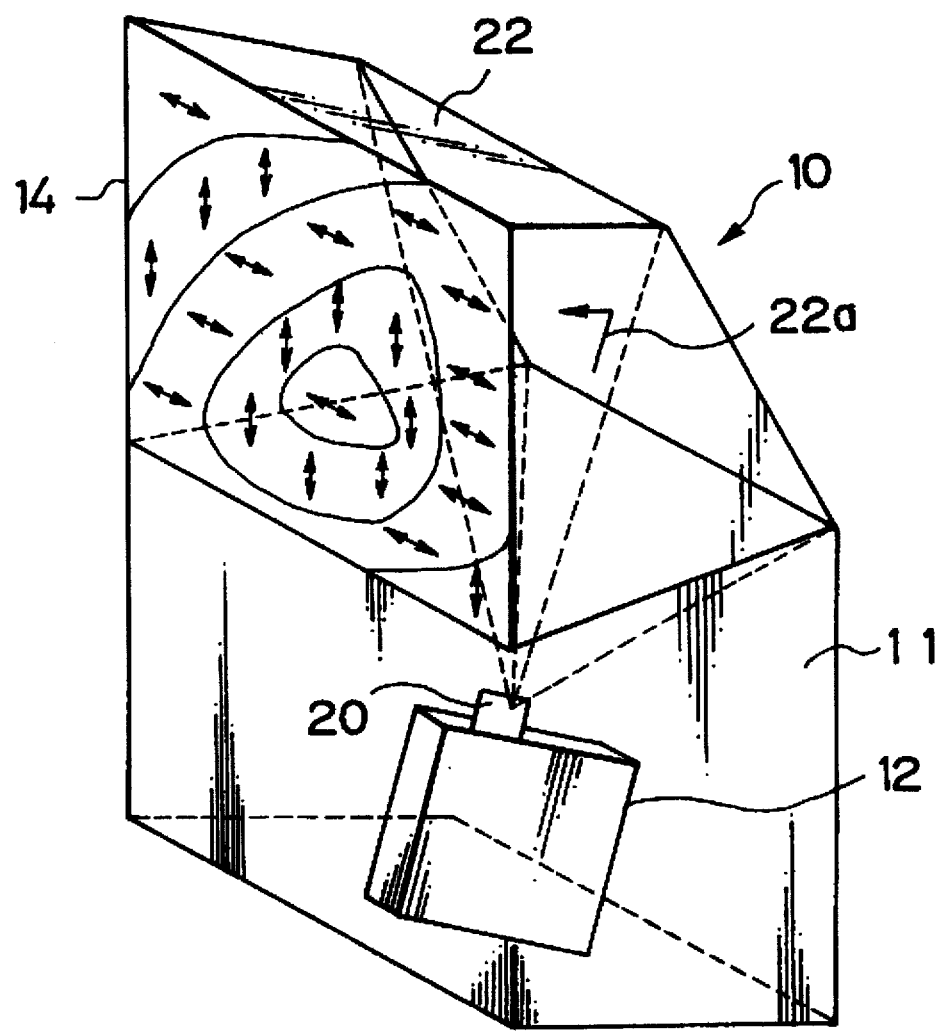
FIG. 15 is a view illustrating the state of the polarized light incident to the screen, with phase difference produced according to the incident angle of FIG. 14.

Therefore, as shown in FIG. 15, although the light made incident to the mirror 22 is a uniform linear polarized light, the light reflected by the mirror 22 and made incident to the screen 14 includes various linear polarized lights having a various vibrating planes corresponding to the phase differences derived from the iso-phase-difference lines 53, and there are elliptical polarized lights at the boundaries between the lines 53.

As described previously with reference to FIG. 8, there is a difference between the light distribution characteristics of P-polarized light and S-polarized light. In this case, p-polarized light has a horizontal vibrating plane regarding the screen 14 and S-polarized light has a vertical vibrating plane regarding the screen 14. Therefore, at a position of the screen 14 where mainly a linear polarized light having a vibrating plane corresponding to P-polarized light regarding the screen 14 is incident to the mirror 22, the brightness of the screen 14 becomes higher since the amount of the light passing through the screen 14 in the state of P-polarized light is higher, as shown in FIG. 8.

Conversely, at a position of the screen 14 where mainly a linear polarized light having a vibrating plane corresponding to S-polarized light regarding the screen 14 is incident to the mirror 22, the brightness of the screen 14 becomes lower since the amount of the light passing through the screen 14 in the state of S-polarized light is lower, as shown in FIG. 8. It is considered that the uneven pattern 43 of FIG. 9 appears in this manner, as a brightness variation in the monochromatic display and as a color variation in the color display.

In summary, it can be concluded that the uneven pattern 43 of FIG. 9 appears when a polarized light reflected by the mirror 22, which has a distributed phase difference due to anisotropy of the plastic film 34 in the mirror 22, and a difference between the light distribution characteristics in the vertical direction and in the horizontal direction in the screen 14, are appropriately combined under certain conditions.

Means to Eliminate Uneven Pattern

Therefore, the above described Japanese Patent Application No. 6-314915 proposed to solve the uneven pattern 43 by eliminating the distribution of phase difference of the emerging polarized light caused by anisotropy of the plastic sheet 34 of the mirror 22. The previous application solves the problem regarding the mirror 22 and the description thereof is repeated here.

Figure 16A:
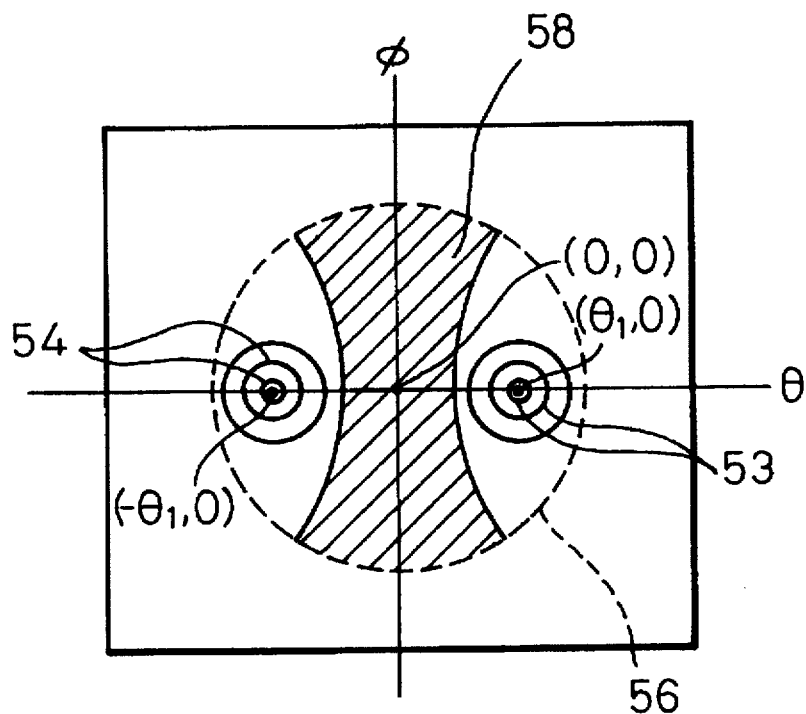
FIG. 16A is a view illustrating the area of the incident light determined according to the first embodiment of the present invention.
Figures 16B, 16C:
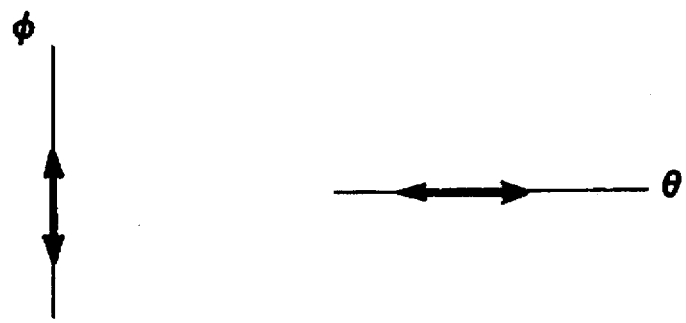
FIG. 16B is a view of the polarized light having a vibrating plane parallel to the $\phi$ axis which is perpendicular to the $\theta$ axis.
FIG. 16C is a view of the polarized light having a vibrating plane parallel to the $\theta$ axis.

FIGS. 16A to 16C show the feature of the plastic sheet 34 of the mirror 22 and the lenticular lens 41 (transparent member) of the screen 14. FIG. 16A is somewhat similar to FIG. 13, and the identical reference numerals are used to show the identical elements throughout the Figures. The feature of FIG. 16A can be applied to the projector 10 of FIGS. 1 and 2 comprising the projector lens 20, the mirror 22 including the plastic film 34 and the reflection film 35, and the screen 14.

The feature of the plastic sheet 34 of the mirror 22 is first described. For the clarity of the description, it is first supposed that the lenticular lens 41 of the screen 14 is made from an acryl plate having optical isotropy, and the plastic sheet 34 of the mirror 22 is made from a polyester film having optical anisotropy.

FIG. 16A is a view similar to FIG. 13, except for the design of the incident angle of the light projected by the projector lens 20 and made incident to the mirror 22. FIG. 16A shows the distribution of the phase difference between the incident polarized light and the emerging polarized light when the linear polarized light is made incident to the plastic sheet 34, similarly to FIG. 13. The horizontal axis is the angle $\theta$ and the vertical axis is the angle $\phi$. Similarly to the distribution in FIG. 13, two groups of substantially concentric isophase-difference lines 53 and 54 are formed about the point $(\theta_1, 0)$ and about the point $(-\theta_1, 0)$. Two iso-phase-difference lines 53 and 54 are arranged in a dense arrangement.

In FIG. 16A, a waisted isophase-difference region 58 exists within the total reflection boundary line 56 and extends between two isophase-difference lines 53 and 54. The property of this phase-difference region 58 is similar to that of the region 55 in FIG. 13.

The plastic sheet 34 of the mirror 22 is arranged so that the incident angle of the light projected by the projector lens 20 and made incident to the plastic sheet 34 of the mirror 22 exists only within the region 58. As described previously, the divergent light emerging from the projection lens 20, includes a light component passing through the optical axis of the projection lens 20 and other light components travelling at various angles relative to the optical axis of the projection lens 20. The incident angles of the light components of the divergent light made incident to the mirror 22 are within the region 58 in FIG. 16A. It should be noted that the region 58 does not include the point $(-\theta_1, 0)$ and the point $(\theta_1, 0)$, so any one of the light components of the divergent light projected by the projector lens 20 is not parallel to the optical axis 45 or 46.

Preferably, the linear polarized light emerging from the projector lens 20 has a vibrating plane which is parallel to the $\theta$-axis corresponding to the optical axis plane 47 or to $\phi$-axis perpendicular to the $\theta$-axis, as shown in FIGS. 16B and 16C. By this arrangement, the vibrating plane of the linear polarized light made incident to the mirror 22 is the same as the vibrating plane of the linear polarized light reflected by the mirror 22 and projected to the screen 14.

The mirror 22 having this feature can be used in combination with the screen 14 having the feature of FIGS. 6 and 8 in which the light distribution characteristic in the horizontal direction differs from the light distribution characteristic in the vertical direction (here, it is not considered that the screen 14 is made from a material having optical anisotropy). In this case, the uneven pattern 43 of FIG. 9 does not appear since there is no substantial distribution of phase difference in the polarized light reflected by the mirror 22, despite the fact that there is a difference in the light distribution characteristics in the screen 14.

The description is now made regarding the case in which the lenticular lens 41 of the screen 14 is made from a polyester film having optical anisotropy and is arranged according to the disposition of FIG. 14. In this case, when a linear polarized light in a generally uniformly polarized condition passes through the lenticular lens 41 of the screen 14, a distribution of phase difference similar to that caused when a linear polarized light passes through the plastic film 34 of the mirror 22 is caused, and therefore, an uneven pattern similar to the uneven pattern 43 appears because of the combination of the distribution of phase difference and the light distribution characteristics for P- and S-polarized light.

The screen 14 of the present invention can be applied not only to the case in which the back surface reflection mirror 22 is made from polyester and arranged in the above described manner, but also to the case in which the mirror 22 is made from glass or the mirror 22 is not provided. In each case, a linear polarized light in a generally uniformly polarized condition is made incident to the screen 14, so it is possible to consider the problem of the screen 14 while neglecting the mirror 22 between the projection lens 20 and the screen 14.

In order to eliminate the uneven pattern 43 caused by the screen 14, the lenticular lens 41 of the screen 14 is arranged similarly to the polyester plastic sheet 34 of the mirror 22. That is, the lenticular lens 41 of the screen 14 is arranged so that the incident angle of the light projected by the projector lens 20 and made incident to the screen 14 exists only within the region 58. The divergent light emerging from the projection lens 20, includes a light component passing through the optical axis of the projection lens 20 and other light components travelling at various angles relative to the optical axis of the projection lens 20. The incident angles of the light components of the divergent light made incident to the screen 14 are within the region 58 in FIG. 16A. It should be noted that the region 58 does not include the point $(-\theta_1, 0)$ and the point $(\theta_1, 0)$, so any one of the light components of the divergent light projected by the projector lens 20 is not parallel to the optical axis 45 or 46.

Preferably, the linear polarized light emerging from the projector lens 20 has a vibrating plane which is parallel to the θ-axis corresponding to the optical axis plane 47 or to θ-axis perpendicular to the θ-axis of the lenticular lens 41 of the screen 14, as shown in FIGS. 16B and 16C. By this arrangement, the vibrating plane of the linear polarized light made incident to the screen 14 is the same as the vibrating plane of the linear polarized light emerging from the screen 14. That is, the vibrating plane of the linear polarized light emerging from the screen 14 coincides with that of P- or S-polarized light.

Figure 17:
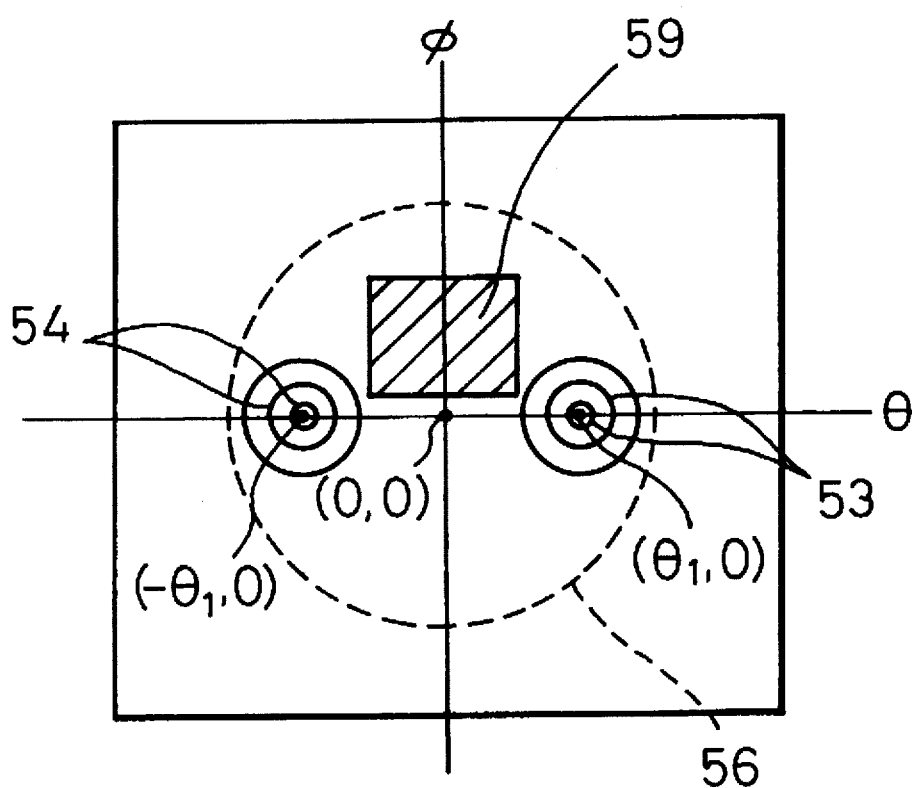
FIG. 17 is a view illustrating the area of the incident light modified from that of FIG. 16A.

FIG. 17 shows a preferred example modified from the arrangement of FIG. 16A. In FIG. 17, the incident angle of the light projected by the projector lens 20 and made incident to the mirror 22 are within the region 59. This region 59 corresponds to a part of the region 58 in FIG. 16A, and the incident angle is allowed to exist only one side of the θ axis. As shown in FIG. 3, the projection lens 20 is arranged in a vertical center plane of the mirror 22 and is aimed at the mirror 22 from below the mirror 22. In the case of the lenticular lens 41, the light is made incident to the secreen 14 with the incident angles within the central portion in the region 58 of FIG. 16A.

Figure 18:
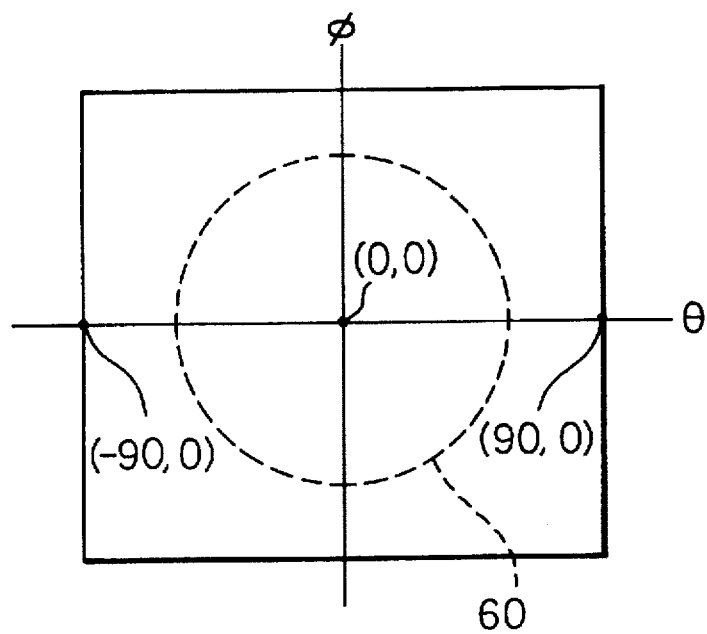
FIG. 18 is a view illustrating an example using a polycarbonate film.

FIG. 18 shows an example in which the plastic sheet 34 and the lenticular lens 41 are stretched and comprise polycarbonate films having uniaxial anisotropy. The polycarbonate film is stretched in one direction, so that an optical axis of the plastic sheet 34 or the lenticular lens 41 is brought generally parallel to the surface thereof. Therefore, the light passing through the plastic sheet 34 of the lenticular lens 41 is not parallel to the optical axis.

Figure 19:
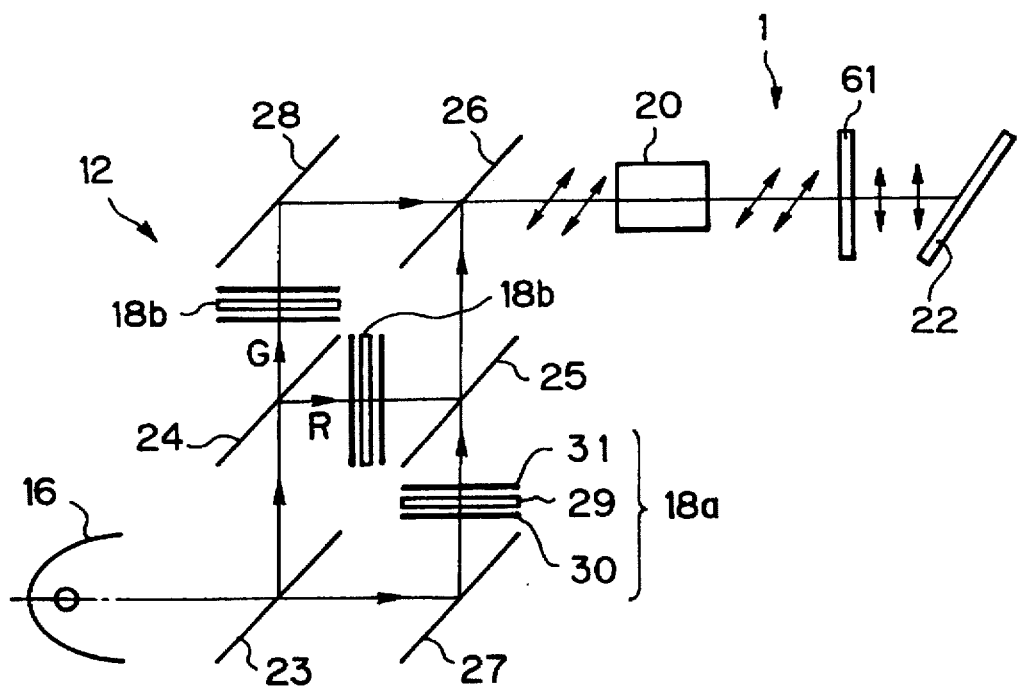
FIG. 19 is a view of the components of the projection unit according to the second embodiment of the present invention.

FIG. 19 shows the second embodiment of the present invention. In FIG. 19, the projection unit 12 of the projector 10 comprises the light source 16, liquid crystal display elements 18a, 18b, and 18c, and the projection lens 20, and the mirror 22 is arranged in the projector casing 11 between the projection lens 20 and the screen 14. Also, there are color separation dichroic mirrors 23 and 24, color combination dichroic mirrors 25 and 26, and total reflection mirrors 27 and 28.

Each liquid crystal display element 18a, 18b, or 18c comprises a liquid crystal panel 29 including a TN-type (twisted nematic type) liquid crystal, the polarizer 30 and the analyzer 31. The polarizer 30 and the analyzer 31 have perpendicular planes. In each liquid crystal display element 18a, 18b, or 18c, the TN-type liquid crystal is held between a pair of transparent glass plates having alignment layers.

Figure 20:
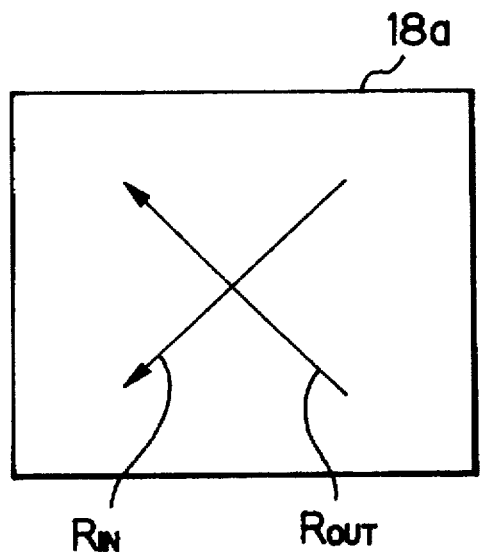
FIG. 20 is a view illustrating the rubbing directions of the liquid crystal display panel.

As shown in FIG. 20, the alignment layer of one of the transparent glass plates to which the light is incident is rubbed in the direction of the arrow $R_{IN}$, and the alignment layer of the other transparent glass plate from which the light emerges is rubbed in the direction of the arrow $R_{OUT}$. These rubbings are carried out at 45 degrees relative to the horizontal of the projector casing 11. The polarizer 30 is arranged to pass therethrough the linear polarized light having a vibrating plane parallel to the arrow $R_{IN}$, and the analyzer 31 is arranged to pass therethrough the linear polarized light having a vibrating plane parallel to the arrow $R_{OUT}$.

It is known that the contrast of the image (the quality of the image) changes depending on the viewing angle at which the screen is viewed. According to the rubbing arrangement of FIG. 20, the viewing angle characteristic when the screen is horizontally viewed from the left is identical to that when viewed from the right, but a viewing angle characteristic when the screen is vertically viewed from above is different from that when viewed from below. For example, regarding the vertical viewing angle characteristic, the brightness of the screen at one point thereon when viewed from about may be 0.5 lux, but the brightness of the screen at that point when viewed from below may be 2 lux.

The rubbing arrangement of FIG. 20 may be preferred since the horizontal viewing angle characteristic is usually important in the display. Since the number of reflections of the light passing through the central liquid crystal display element 18b is different from that of the other elements, the central liquid crystal display element 18b is arranged vertically in reverse relative to the remaining elements 18a and 18c, or the panel is driven so that the image in the central liquid crystal display element 18b is reversed. As previously described, it is preferable to project the linear polarized light having a vertically or horizontally vibrating plane.

Accordingly, in FIG. 19, a polarized light converting element 61 is arranged between the projector lens 20 and the mirror 22 for changing the polarized condition or the polarized direction. In the embodiment, the polarized light converting element 61 comprises a half wave film which causes the vibrating plane of the incident linear polarized light to be rotated 45 degrees. Therefore, the linear polarized light, which emerges from the liquid crystal display elements 18a to 18c and has a vibrating plane at 45 degrees relative to the normal, passes through the projection lens 20 and the polarized light converting element 61 and is converted into a linear polarized light having a vertical or horizontal plane. Thus the linear polarized light having a vertical or horizontal plane is incident to the mirror 22, and then to the screen 14.

Figure 21:
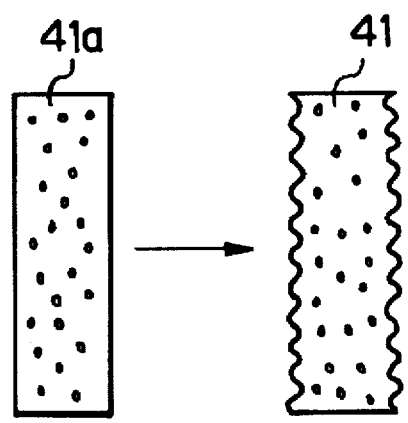
FIG. 21 is a view illustrating the diffusion element of the screen according to the third embodiment of the present invention.

FIG. 21 shows the third embodiment of the present invention. This embodiment is intended to eliminate the uneven pattern 43 by changing the property of the screen 14.

As described above, the screen 14 of FIG. 6 comprises the combination of a circular fresnel lens 40 and a double sided lenticular lens 41. The double sided lenticular lens 41 is made, by making a simple diffusion plate in which diffusion particles such as small beads are mixed therein and then pressing the simple diffusion plate so that peaks and valleys vertically extend on the surfaces of the plate. The central gain of the simple diffusion plate was approximately 20, and the central gain of the double sided lenticular lens 41 obtained by pressing this simple diffusion plate was approximately 5 (see FIG. 8). In the screen 14 comprising the circular fresnel lens 40 and the double sided lenticular lens 41, there was a substantial difference between the light distribution characteristics for P-polarized light and for S-polarized light, as shown in FIG. 8. The uneven pattern 43 of FIG. 9 was produced when the polarized light having the distribution of the phase difference of the FIG. 13 was projected onto the screen 14.

The inventors have carried out experiments to determine a condition of the screen 14 by which the uneven pattern 43 of FIG. 9 can be eliminated even if the polarized light having the distribution of the phase difference of the FIG. 13 is projected to the screen 14. As a result, as shown in FIG. 21, a simple diffusion plate 41a is made by mixing beads therein, and the central gain of this simple diffusion plate 41a is less than 10. The double sided lenticular lens 41 is then obtained by pressing this simple diffusion plate 41a, and the screen 14 is made by the combination of the double sided lenticular lens 41 and the fresnel lens 40. The total gain of the screen 14 is generally lower than 3.

The gain G of the screen 14 is defined by the following relationship of $B=GL/\pi$, where B is the intensity of the incident light (candela), and L is the intensity of the transmitted light. It is, of course, possible to make a double sided lenticular lens 41 from the combination of the simple diffusion plate 41a and a separate lenticular lens.

Figure 22:
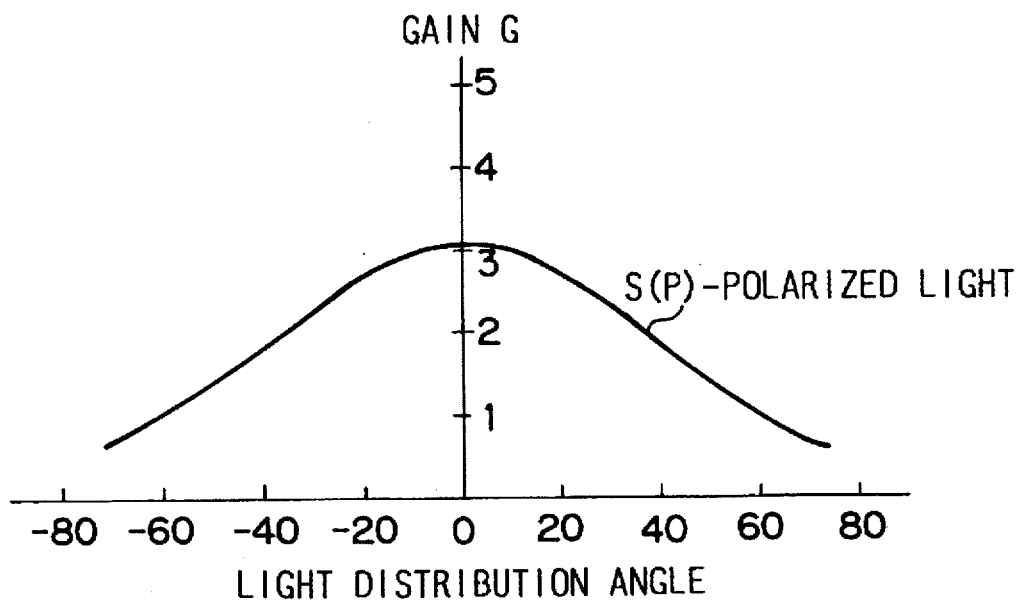
FIG. 22 is a view illustrating the light distribution characteristic of the screen obtained by the diffusion element of FIG. 21.

FIG. 22 shows the light distribution characteristic of this screen 14 including the double sided lenticular lens 41 and the fresnel lens 40. Surprisingly, in this double sided lenticular lens 41, the light distribution characteristic for P-polarized light (having a horizontal plane) is generally identical to the light distribution characteristic for S-polarized light (having a horizontal plane), in the range of a considerably wider distribution angle (viewing angle). The projector 10 is assembled using this screen, and the experiment shows that the uneven pattern 43 of FIG. 9 was not observed, even when the polarized light having the distribution of the phase difference of the FIG. 14 is projected to this screen 14.

Figure 24A:
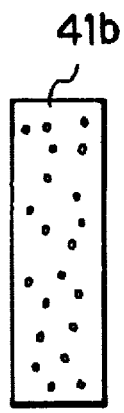
FIG. 24A is a view illustrating the modified diffusion element.
Figure 24B:
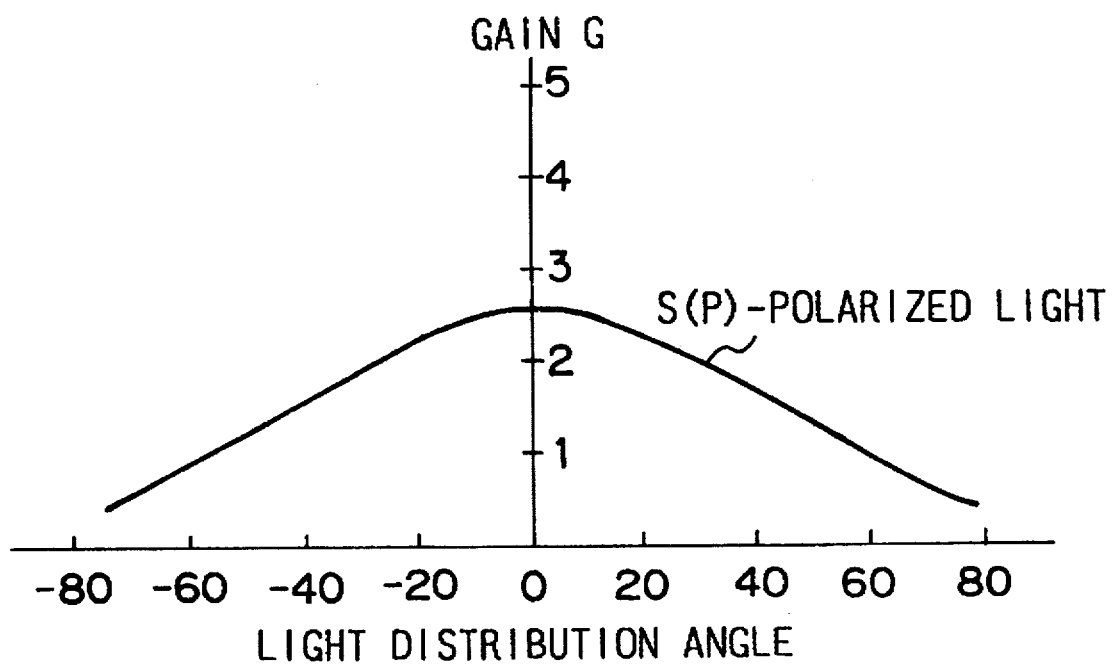
FIG. 24B is a view illustrating the light distribution characteristic of the screen obtained by the diffusion element of FIG. 24A.

FIG. 24A is a modification of FIG. 21, and FIG. 24B shows a view similar to FIG. 22. A simple diffusion plate 41b is made by mixing beads therein, and the central gain of this simple diffusion plate 41b is less than 6. In this case, this simple diffusion plate 41b is used alone. That is, this simple diffusion plate 41b is not pressed and no double sided lenticular lens is formed on either side thereof, nor is any separate lenticular lens laminated thereon. The screen 14 is made by the combination of the simple diffusion plate 41b and the fresnel lens 40. The total gain of the screen 14 is shown in FIG. 24B. In this case too, the light distribution characteristic for polarized light having a horizontal plane (called herein P-polarized light) is generally identical to the light distribution characteristic for polarized light having a vertical plane (called herein S-polarized light). The projector 10 is assembled using this screen, and the uneven pattern 43 was not observed.

In this manner, it can be concluded that if the light distribution characteristic of the screen 14 for P-polarized light is generally identical to the light distribution characteristic of the screen 14 for S-polarized light, the uneven pattern 43 can be eliminated.

Figure 23:
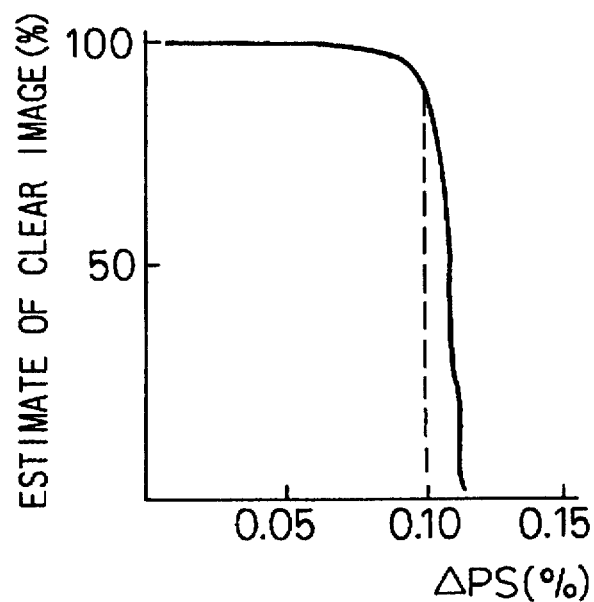
FIG. 23 is a view of the estimate of a clear image versus the difference between the light distribution characteristics of P- and S-polarized lights.

FIG. 23 shows the result of the experiments, by manufacturing many screens 14 having various light distribution characteristics, and by testing the screens to obtain a condition of the screen by which the uneven pattern 43 can be eliminated. Twenty four persons estimated the clearness of the image in the screen (i.e., absence of the unevenness 43) for each screen 14, while viewing an image. The estimate was given by percentage. The abscissa is ΔPH which is a factor representing a difference between the light distribution characteristics for P-polarized light (having a horizontal plane) and S-polarized light (having a vertical plane) of the screen 14. ΔPH is calculated in the following way. R, G, and B in the following parentheses are representative of red, green and blue components.

A(R), A(G), and A(B) are the amounts of the light projected to the screen as a first polarized light, B(R), B(G), and B(B) are the amounts of the light projected to the screen as a second polarized light perpendicular to the first polarized light, and $A(R) \geq B(R)$, $A(G) \geq B(G)$, and $A(B) \geq B(B)$.

G(R,p), G(G,p), and G(B,p) are the gains of the screen for a third polarized light, G(R,s), G(G,s), and G(B,s) are the gains of the screen for a fourth polarized light perpendicular to the third polarized light, and $G(R,p) \geq G(R,s)$, $G(G,p) \geq G(G,s)$, and $G(B,p) \geq G(B,s)$.

$$\Delta(R)=[A(R)\times G(R,p)+B(R)\times G(R,s)]-[A(R)\times G(R,s)+B(R)\times G(R,p)]$$

$$\Delta(G)=[A(G)\times G(G,p)+B(G)\times G(G,s)]-[A(G)\times G(G,s)+B(G)\times G(G,p)]$$

$$\Delta(B)=[A(B)\times G(B,p)+B(B)\times G(B,s)]-[A(B)\times G(B,s)+B(B)\times G(B,p)]$$

$$\Delta P=|\Delta(R)-\Delta(B)|+|\Delta(G)-\Delta(B)|$$

It will be apparent from FIG. 23 that the relationship of ΔPH<0.1 is preferable to eliminate the unevenness 43.

Figure 25:
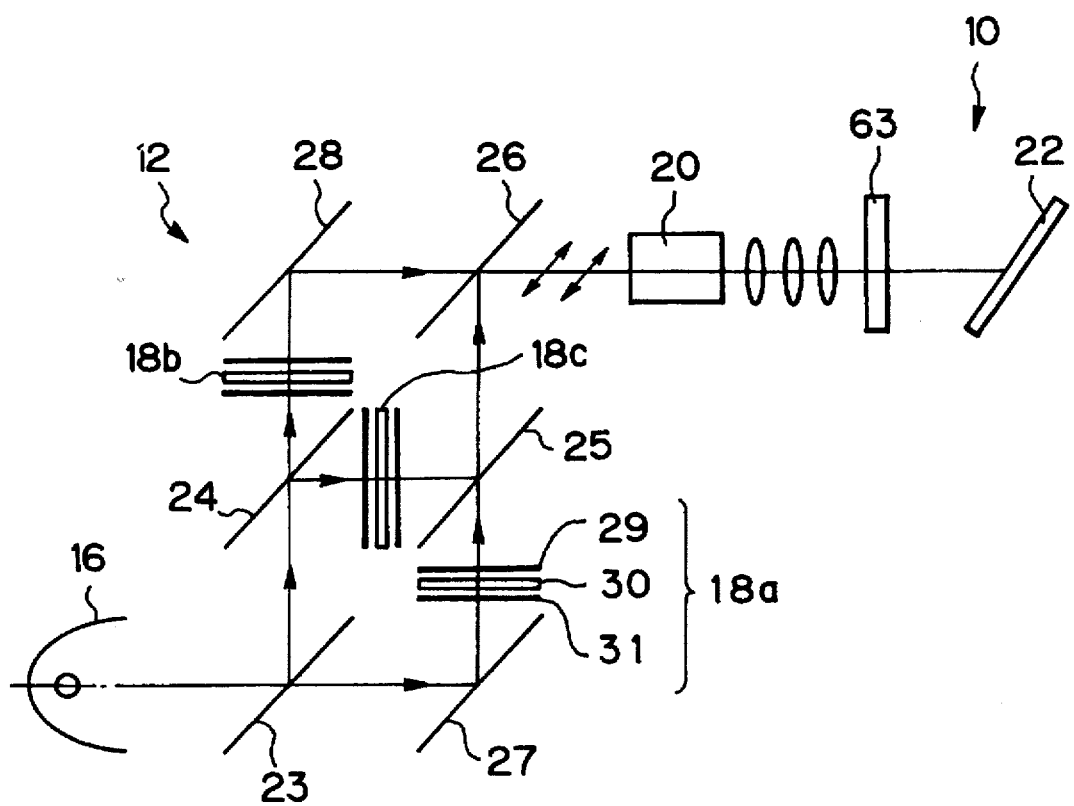
FIG. 25 is a view of the components of the projection unit according to the fourth embodiment of the present invention.

FIG. 25 shows the fourth embodiment of the present invention. In this embodiment, a polarized light converting element 63 is arranged between the liquid crystal display elements 18a to 18c and the mirror 22, in particular, between the projector lens 20 and the mirror 22, for converting a linear polarized light into a generally non-polarized light.

The inventors have found that the uneven pattern 43 does not appear if the light projected by the projection lens 20 and made incident to the screen 14 having optical anisotropy is a generally non-polarized light in view of phase, even if a phase difference exists in the screen 14 and the screen 14 has a difference in its light distribution characteristics.

Generally non-polarized light is the sum of polarized light components having various vibrating planes, and it means that the incidence of the generally non-polarized light to the screen 14 corresponds to the incidence of P-polarized light and S-polarized light mixed together at a certain ratio to the screen 14. Therefore, it is the ratio of P-polarized light and S-polarized light in the generally non-polarized light that can be regarded as a generally non-polarized light. If the generally non-polarized light including a great proportion of P-polarized light component is incident to the screen 14 at a certain point thereof, the brightness of the image at that point will be greater, and if the generally non-polarized light including a great proportion of S-polarized light component is incident to the screen 14 at a certain point thereof, the brightness of the image at that point will be smaller. Experiments and research according to the present invention showed that the uneven pattern 43 cannot be recognized if the difference between the amounts of the light at that point are within ±10 percent.

This condition can be expressed as follows. The light projected by the projection lens 20 and made incident to the screen 14 is a generally non-polarized light defined by the relationship of $(A \times P + B \times S) \leq 1.1 \times (A \times S + B \times P)$. Here, P and S are gains of the screen 14 in the first and second light distribution characteristics regarding P-polarized light and S-polarized light (see FIG. 8) at a particular distribution angle at which it is desired to obtain a clear image, with $P \geq S$, and A and B are the amounts of the linearly polarized light projected to the screen 14, with $A \geq B$.

For example, when the screen 14 is viewed obliquely and horizontally at the angle of 50 degrees, P=1.5 regarding the polarized light having a horizontally vibrating plane and S=1.3 regarding the polarized light having a vertically vibrating plane. By inserting these values into the above relationship, the relationship of $B/A \geq 0.2$ is obtained. Accordingly, it will be appreciated that a linear polarized light should be converted into a generally non-polarized light which satisfies this relationship.

In the sample projector 10, the limit of the horizontal viewing angle at which the image can be recognized is 70 degrees, and the brightness is 30 candela. The gain P of the screen 14 at this point is 0.3, and the gain S is lower than 0.3. Therefore, the result is B/A≧0.85. One example of the polarized light converting element 63 is a roughened polycarbonate plate with polymethyl methacrylate deposited thereon.

Figure 26:
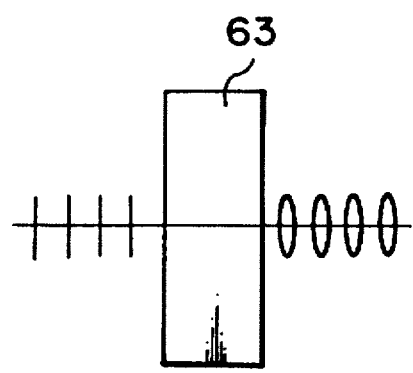
FIG. 26 is a view of an example of the polarized light converting element of FIG. 28.
Figure 27:
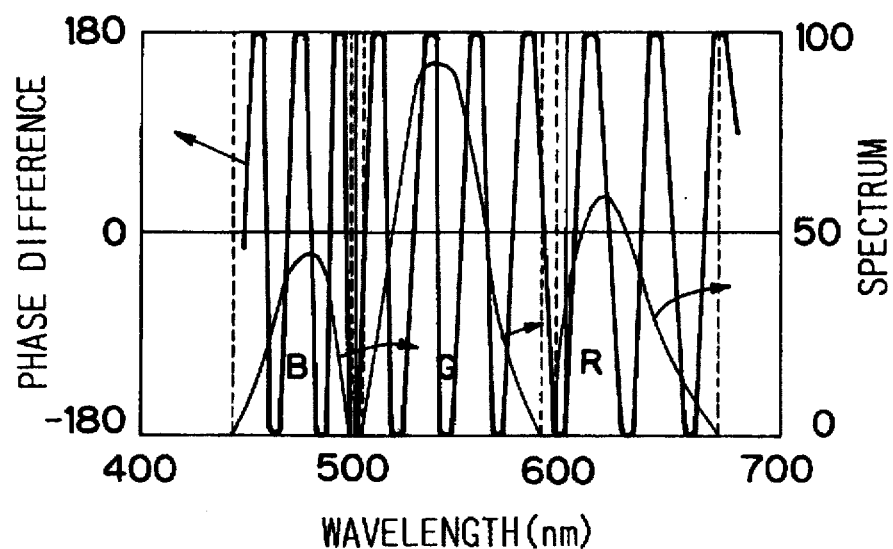
FIG. 27 is a diagram illustrating the phase difference and the spectrum versus the wavelength.

FIG. 26 shows an example of the polarized light converting element 63 comprising a thick phase plate. By setting an appropriate thickness d of the plate and an optical path difference Δand considerably greater than the wavelength λ, a generally non-polarized light is obtained from the light including the spectrum of red, green and blue bandwidth (FIG. 27), although an elliptical polarized light, a circular polarized light or a linear polarized light is obtained from the light including a single spectrum.

Figure 28:
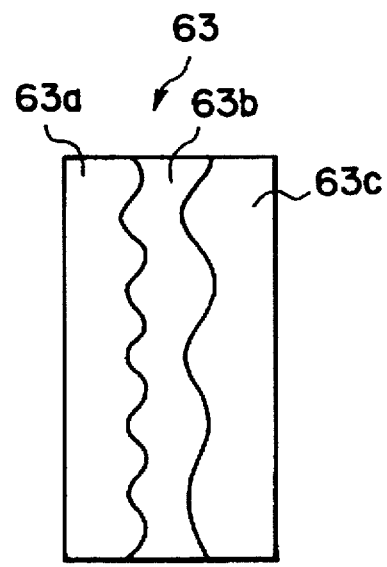
FIG. 28 is a view of another example of the polarized light converting element.
Figure 29:
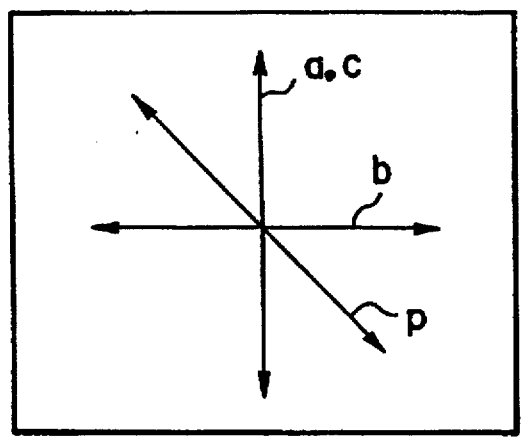
FIG. 29 is a view illustrating the direction of the fast axes of the polarized light converting element of FIG. 31.

FIG. 28 shows another example of the polarized light converting element 63 comprising three phase plates 63a, 63b and 63c. Three phase plates 63a, 63b and 63c are polycarbonate-polymethyl methacrylate-polycarbonate layers and are fused together. The interfaces between the layers are not flat. The fast axes "a", "b" and "c" of three phase plates 63a, 63b and 63c are arranged relative to the vibrating direction of the incident polarized light, as shown in FIG. 29. By this arrangement, a linear polarized light can be converted into a generally non-polarized light.

Figure 30:
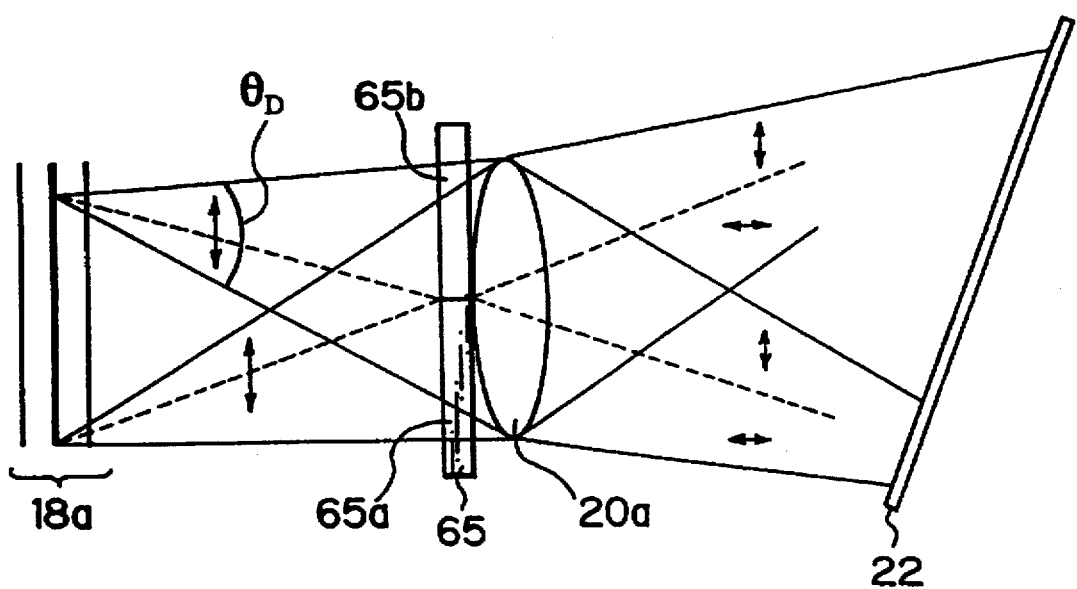
FIG. 30 is a view of the projection lens and the back surface reflecting mirror according to the fifth embodiment of the present invention.

FIG. 30 shows the fifth embodiment of the present invention. The projector 10 of this embodiment comprises the light source 16, the liquid crystal display elements 18a to 18c, the projection lens 20 (represented by a lens member 20a), the mirror 22 including the plastic sheet 34 and the reflection film 35, and the screen 14 (refer to FIGS. 1 and 2 regarding the elements not shown in FIG. 30). The light is modulated by the liquid crystal display element 18a, 18b or 18c and diverges from pixels thereof toward the projection lens 20 and the mirror 22. The light diverging substantially from one point of the liquid crystal display elements 18a to 18c is in a generally regularly polarized state with respect to the diverging angle $\theta_A$.

A polarized light converting element 65 is provided between the liquid crystal display elements 18a to 18c and the projector lens 20. The polarized light converting element 65 has a similar function to that of the polarized light converting element 63 in FIG. 25. The polarized light converting element 65 converts light in a generally regularly polarized state with respect to the diverging angle $\theta_A$ into light in an irregularly polarized state with respect to the diverging angle $\theta_A$.

The polarized light converting element 65 in FIG. 30 is divided into a plurality (two in FIG. 30) of regions 65a and 65b, each of the regions having a different polarized light converting function. For example, the divided polarized light converting regions 65a and 65b comprise linear phase films having different optical lengths or rotary polarizing films having different optical activities.

Figure 31A:
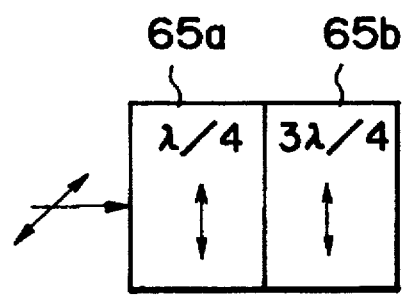
FIGS. 31A and 31B are views illustrating an example of the divided regions of the polarized light converting element.
Figure 31B:
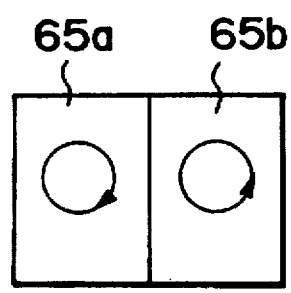

FIGS. 31A and 31B show an example of the divided regions 65a and 65b of the polarized light converting element 65. The region 65a comprises a ¼ wave film having a slow axis (or a fast axis) extending in a certain direction, so that it converts the linear polarized light having a vibrating plane extending at 45 degrees into a clockwise (or anticlockwise) rotating circular polarized light, as shown in FIG. 31B. The other region 65b comprises a ¾ wave film having a slow axis (or a fast axis) extending in the same manner as the former, so that it converts the linear polarized light having a plane extending at 45 degrees into a anti-clockwise (or clockwise) rotating circular polarized light, as shown in FIG. 31B. The thickness and the refractive index of the regions 65a and 65b are controlled so that the phase difference between the regions 65a and 65b for light having a constant wavelength is one half of the wavelength.

The polarized light converting element 65 is arranged close to the projection lens 20 so as to function equally regarding the modulated light emerging from the respective pixels of the liquid crystal display elements 18a, 18b and 18c. This arrangement also has an advantage that an interface between the regions 65a and 65b comprising organic films does not cause an undesirable image.

Figure 32A:
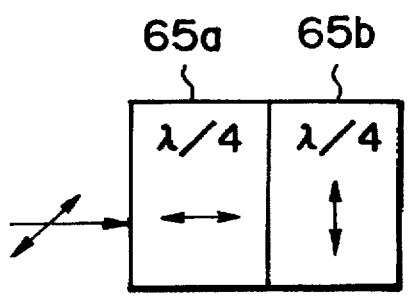
FIGS. 32A and 32B are views illustrating another example of the divided regions of the polarized light converting element.
Figure 32B:
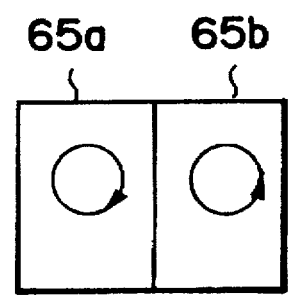

FIGS. 32A and 32B show another example of the divided regions 65a and 65b of the polarized light converting element 65. The region 65a comprises a ¼ wave film having a slow axis (or a fast axis) extending in a certain direction, so that it converts the linear polarized light into a clockwise (or anticlockwise) rotating circular polarized light. The other region 65b comprises a ¼ wave film having a slow axis (or a fast axis) extending perpendicular to the former, so that it converts the linear polarized light into a anticlockwise (or clockwise) rotating circular polarized light.

Figure 33A:
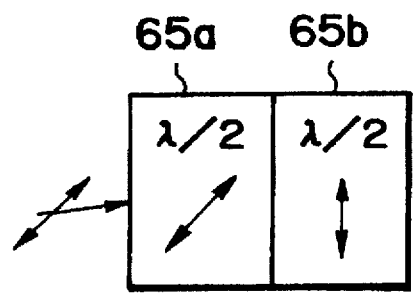
FIGS. 33A and 33B are views illustrating still another example of the divided regions of the polarized light converting element.
Figure 33B:
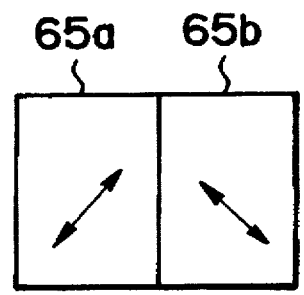

FIGS. 33A and 33B show still another example of the divided regions 65a and 65b of the polarized light converting element 65. The region 65a comprises a half wave film having a slow axis (or a fast axis) extending in a certain direction, so that it converts the linear polarized light into a linear polarized light having the same plane as that when it is incident, as shown in FIG. 33B. The other region 65b comprises a half wave film having a slow axis (or a fast axis) extending at 45 degrees relative to that when it is incident, so that it converts the linear polarized light into a linear polarized light having a plane rotated 90 degrees from the initial state. In this embodiment, the region 65a is arranged so that the slow axis thereof coincides with the vibrating plane of the incident light, but the vibrating planes of the linear polarized lights from the regions 65a and 65b are perpendicular to each other if the vibrating direction of the incident light is changed.

Figure 34A:
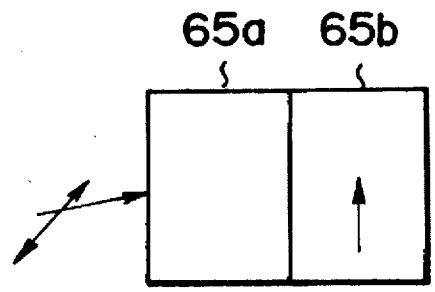
FIGS. 34A and 34B are views illustrating still another example of the divided regions of the polarized light converting element.
Figure 34B:
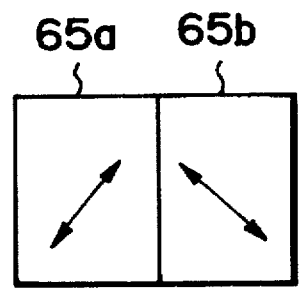

FIGS. 34A and 34B show still another example of the divided regions 65a and 65b of the polarized light converting element 65. The region 65a is an optical path length correction plate comprising a glass plate having a certain thickness, which converts the linear polarized light into a linear polarized light having the same plane as that when it is incident, as shown in FIG. 33B. The other region 65b comprises a half wave film having a slow axis (or a fast axis) extending in a predetermined direction, so that it converts the linear polarized light into a linear polarized light having its plane rotated 90 degrees from the initial state, as shown in FIG. 40B. Therefore, the vibrating planes of the linear polarized light emerging from the regions 65a and 65b are perpendicular to each other, and the optical path length correction plate in the region 65a corrects the optical path length corresponding to the plate of the region 65a.

Figure 35A:
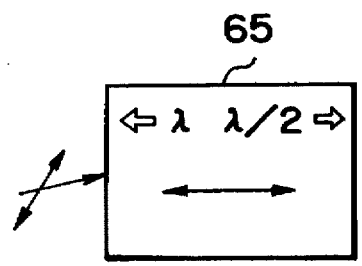
FIGS. 35A to 35C are views illustrating another example of the polarized light converting element.
Figure 35B:
Figure 35C:
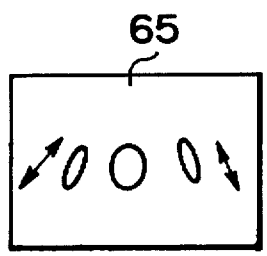

FIGS. 35A to 35C show another example of the polarized light converting element 65° FIG. 35A is a plan view of the element 65, FIG. 35B is a side view of the element 65, and FIG. 35C illustrates the operation of the element 65. The polarized light converting element 65 has a tapered thickness, as shown in FIG. 35B, so that it functions as a full wave film at one end of the element 65 and as a half wave film at the other end of the element 65 and the characteristic continuously changes from one end to the other end, as shown in FIG. 35A. Therefore, the light emerging from the element 65 becomes linear polarized light, elliptical polarized light or circular polarized light depending on the position in the element 65, as shown in FIG. 35C. The polarized light converting element 65 is of a distribution type linear phase plate in which a polarized light converting function changes spatially and continuously.

Figure 36A:
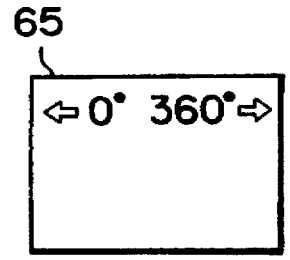
FIGS. 36A to 36C are views illustrating still another example of the polarized light converting element.
Figure 36B:
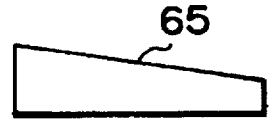
Figure 36C:
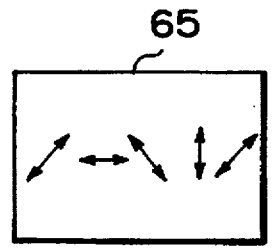

FIGS. 36A to 36C show the other example of the polarized light converting element 65. FIG. 36A is a plan view of the element 65, FIG. 36B is a side view of the element 65, and FIG. 36C illustrates the operation the element 65. The polarized light converting element 65 is a distribution type rotary polarizing plate in which optical activity changes spatially and continuously. The plate comprises a magnetic garnet or a liquid crystal polymer and has a tapered thickness, as shown in FIG. 36B, so that it functions to rotate the phase of the emerging light from zero at one end thereof to 360 degrees at the other end thereof and the characteristic continuously changes from one end to the other end, as shown in FIG. 36A. Therefore, the light emerging from the element 65 becomes a linear polarized light having a vibrating plane which changes depending on its position in the element 65, as shown in FIG. 36C. The arrangements of FIGS. 36A to 36C have no interface which might exist in the divided polarized light converting element 65, and thus the projected light is not dispersed. To compensate for the optical path length of the element 65 having a thickness which changes in a taper, it is possible to use an optical path length correction plate (refer to FIG. 34, for example).

Figure 37:
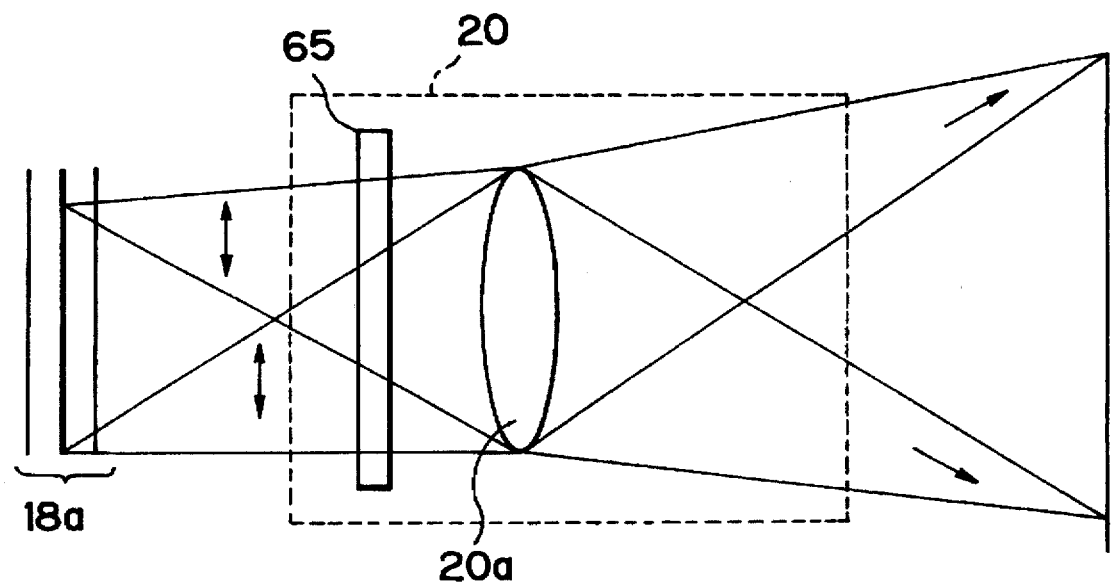
FIG. 37 is a view of the projection lens and the back surface reflecting mirror according to the sixth embodiment of the present invention.
Figure 38:
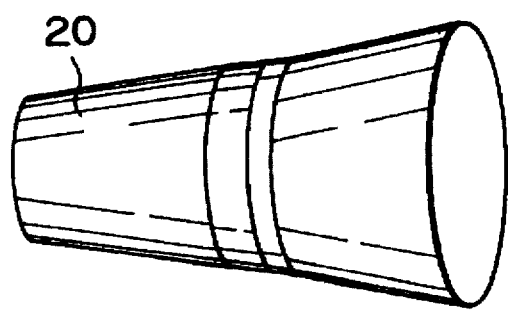
FIG. 38 is a perspective view of the projection lens of FIG. 37.
Figure 39:
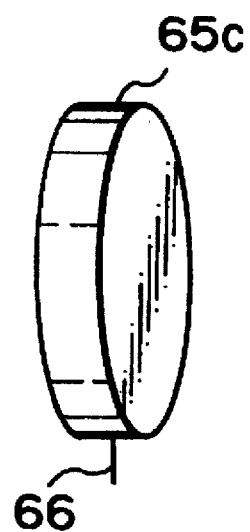
FIG. 39 is a view of the holder of the polarized light converting element of FIG. 37.

FIGS. 37 to 39 show the sixth embodiment of the present invention which is generally similar to FIG. 30. The projector 10 of this embodiment comprises the light source 16, the liquid crystal display elements 18a to 18c, the projection lens 20, the mirror 22 including the plastic sheet 34 and the reflection film 35, and the screen 14 (refer to FIGS. 1 and 2 regarding the elements not shown in FIG. 37). The polarized light converting element 65 is provided between the liquid crystal display elements 18a to 18c and the projector lens 20. The polarized light converting element 65 is preferably incorporated in the projection lens 20 at the position of the exit pupil. In particular, the polarized light converting element 65 is attached to a holder 65c of FIG. 39 which can be incorporated in the projection lens 20 by a screw fitting. The holder 65c has a stop screw 66 by which the holder 65c with the element 65 can be fixed to the projection lens 20 after the element 65 is adjusted relative to the projection lens 20 so that the element 65 is brought into an adequate position relative to the mirror 22.

As described in greater detail, according to the present invention, it is possible to obtain a larger and lighter projector in which unevenness in the image can be eliminated.

We claim:

1. A projector comprising:
   a light source;
   at least one space modulation element arranged to receive the light from said light source for producing modulated light;
   at least one projection lens arranged to receive the modulated light for projecting the modulated light;
   a screen arranged to receive the light projected by the projection lens for producing an image thereon, the screen having a first light distribution characteristic for vertical polarized light and a second light distribution characteristic for horizontal polarized light whereby the first light distribution characteristic differs from the second light distribution characteristic, the screen including at least in part a transparent member having optical anisotropy and at least one optical axis; and
   wherein the screen is arranged such that an arbitrary light component of the light projected by the projection lens and passing through the transparent member of the screen is not parallel to the at least one optical axis of the transparent member.

2. A projector according to claim 1, wherein the at least one optical axis of the transparent member of the screen is generally parallel to the surface of the transparent member.

3. A projector according to claim 2, wherein the transparent member of the screen comprises a polycarbonate film having uniaxial anisotropy.

4. A projector according to claim 1, wherein the transparent member of the screen has two optical axes and an optical axis plane including said two optical axes, said optical axis plane being generally perpendicular to a surface of the screen.

5. A projector according to claim 4, wherein the transparent member of the screen comprises a polyester film.

6. A projector according to claim 5, wherein the direction of polarization of the light projected by the projection lens and made incident generally normally to the screen is generally perpendicular to said optical axis plane or generally parallel to said optical axis plane.

7. A projector according to claim 1, wherein a polarized film is arranged on the screen on the side remote from the projection lens, the polarized film having a transmission axis extending parallel to the direction of polarization of the incident light.

8. A projector according to claim 1, wherein the at least one space modulation element comprises a polarizer, a TN-type liquid crystal panel, and an analyzer.

9. A projector according to claim 1, further comprising a polarized light converting element arranged between the at least one space modulation element and the screen.

10. A projector according to claim 1, further comprising a back surface reflection mirror arranged between the projection lens and the screen, the back surface reflection mirror including a transparent plastic sheet and a reflecting film superposed on the plastic sheet and arranged relative to the projection lens so that the light projected by the projection lens and passing through the back surface reflection mirror is not parallel to an optical axis of the transparent plastic sheet.

11. A projector comprising:
    a light source;
    at least one space modulation element arranged to receive the light from said light source for producing a modulated light;
    at least one projection lens arranged to receive the modulated light for projecting the modulated light;
    a screen arranged to receive the light projected by the projection lens for producing an image thereon, the screen having a first light distribution characteristic for vertical polarized light and a second light distribution characteristic for horizontal polarized light whereby the first light distribution characteristic differs from the second light distribution characteristic the screen including at least in part a transparent member having optical anisotropy and at least one optical axis; and
    wherein there is the relationship of $\Delta PH<0.1$ where R, G, and B in the following parentheses are representative of red, green and blue components,
    A(R), A(G), and A(B) are the amounts of the light projected onto the screen as a first polarized light,
    B(R), B(G), and B(B), are the amounts of the light projected onto the screen as a second polarized light perpendicular to the first polarized light, $A(R)>B(R)$, $A(G)>B(G)$, and $A(B)>B(B)$, G(R,p), G(G,p), and G(B,p) are the gains of the screen for a third polarized light, G(R,s), G(G,s), and G(B,s) are the gains of the screen for a fourth polarized light perpendicular to the third polarized light, G(R,p)≧G(R,s), G(G,p)≧G(G,s), and G(B,p)≧G(B,s), and $\Delta(R)=|[A(R)\times G(R,p)+B(R)\times G(R,s)]-[A(R)\times G(R,s)+B(R)\times G(R,p)]|$ $\Delta(G)=|[A(G)\times G(G,p)+B(G)\times G(G,s)]-[A(G)\times G(G,s)+B(G)\times G(G,p)]|$ $\Delta(B)=|[A(B)\times G(B,p)+B(B)\times G(B,s)]-[A(B)\times G(B,s)+B(B)\times G(B,p)]|$ $\Delta PH=|\Delta(R)-A(B)|+|\Delta(G)-\Delta(B)|$.

12. A projector according to claim 11, wherein the transparent member of the screen comprises a directional diffusion member having by itself a central gain smaller than 6.

13. A projector according to claim 12, wherein the transparent member of the screen is formed as a lenticular lens.

14. A projector according to claim 11, wherein the screen comprises said transparent member and a simple diffusion element having by itself a central gain smaller than 10.

15. A projector according to claim 14, wherein the simple diffusion element comprises a fresnel lens.

16. A projector according to claim 11, wherein said at least one space modulation element comprises a polarizer, a TN-type liquid crystal panel, and an analyzer.

17. A projector according to claim 11, further comprising a polarized light converting element arranged between the at least one space modulation element and the screen.

18. A projector according to claim 11, further comprising a back surface reflection mirror arranged between the projection lens and the screen, the back surface reflection mirror including a transparent plastic sheet and a reflecting film superposed on the plastic sheet and arranged relative to the projection lens so that the light projected by the projection lens and passing through the back surface reflection mirror is not parallel to an optical axis of the transparent plastic sheet.

19. A projector comprising:

a light source;

at least one space modulation element arranged to receive the light from said light source for producing a modulated light;

at least one projection lens arranged to receive the modulated light and for projecting the modulated light;

a screen arranged to receive the light projected by the projection lens for producing an image thereon, the screen having a first light distribution characteristic for a vertical linearly polarized light and a second light distribution characteristic for a horizontal linearly polarized light, the first light distribution characteristic differing from the second light distribution characteristic, the screen including at least in part, a transparent member having optical anisotropy and at least one optical axis; and wherein the light projected by the projection lens and made incident to the screen is a generally non-polarized light defined by the relationship of $(A\times P+B\times S)\leq 1.1 (A\times S+B\times P)$ where P and S are gains of the screen in the first and second light distribution characteristics at a particular distribution angle at which it is desired to obtain a clear image, with P≧S, and A and B are the amounts of the linearly polarized lights projected to the screen, with A≧B.

20. A projector according to claim 19, wherein said at least one space modulation element comprises a polarizer, a TN-type liquid crystal panel, and an analyzer.

21. A projector according to claim 19, further comprising a polarized light converting element arranged between the at least one space modulation element and the screen.

22. A projector according to claim 19, further comprising a back surface reflection mirror arranged between the projection lens and the screen, the back surface reflection mirror including a transparent plastic sheet and a reflecting film superposed on the plastic sheet and arranged relative to the projection lens so that the light projected by the projection lens and passing through the back surface reflection mirror is not parallel to an optical axis of the transparent plastic sheet.

23. A projector comprising:

a light source;

at least one space modulation element arranged to receive the light from said light source for producing a modulated light;

at least one projection lens arranged to receive the modulated light for projecting the modulated light;

a screen arranged to receive the light projected by the projection lens for producing an image thereon, the screen having a first light distribution characteristic for vertical polarized light and a second light distribution characteristic for horizontal polarized light whereby the first light distribution characteristic differs from the second light distribution characteristic, the screen including at least in part a transparent member having optical anisotropy and at least one optical axis; and wherein the modulated light diverging from substantially one point on the at least one space modulation element is in a generally regularly polarized state with respect to a diverging angle, and a polarized light converting element is provided for converting a generally regularly polarized light with respect to the diverging angle into an irregularly polarized light with respect to the diverging angle.

24. A projector according to claim 23, wherein said polarized light converting element is divided into a plurality of regions, each of the regions having a different polarized light converting function.

25. A projector according to claim 24, wherein said polarized light converting element comprises one of (a) linear phase plates having different optical lengths for the respective regions and (b) rotary polarizing plates having different optical activities for the respective regions.

26. A projector according to claim 24, wherein said polarized light converting element comprises linear phase plates having different slow axes for the respective regions.

27. A projector according to claim 24, wherein said divided regions are arranged so that the light emerges from the respective regions in the form of one pair of (a) linear polarized light beams having planes perpendicular to each other, (b) right and left circular polarized light beams, and (c) elliptical polarized light beams having perpendicular long axes.

28. A projector according to claim 24, wherein the light made incident to the polarized light converting element is mainly a linearly polarized light, and one of the two divided regions is a half-wave plate having a fast axis at approximately 45 degrees relative to the vibrating plane of the incident light.

29. A projector according to claim 24, wherein one of the divided regions has a linear birefringence or a circular birefringence and the other region has an isotropy.

30. A projector according to claim 23, wherein said polarized light converting element is of a distributed type in which a polarized light converting function changes spatially continuously.

31. A projector according to claim 24, wherein said polarized light converting element comprises a distributed type linear phase plate in which an optical length changes spatially and continuously and a distributed type rotary polarizing plate in which optical activity changes spatially and continuously.

32. A projector according to claim 23, wherein said polarized light converting element is arranged in or near the projection lens.

33. A projector according to claim 32, wherein said polarized light converting element is incorporated in the projection lens.

34. A projector according to claim 32, wherein said polarized light converting element is rotatably arranged in the projection lens.

* * * * *

UNITED STATES PATENT AND TRADEMARK OFFICE
CERTIFICATE OF CORRECTION

PATENT NO.   : 5,694,245
DATED        : December 2, 1997
INVENTOR(S)  : Goto et al.

It is certified that error appears in the above-identified patent and that said Letters Patent is hereby corrected as shown below:

ON THE TITLE PAGE

Under "[75]" Inventors, delete "Kabayashi"

and insert --Kobayashi-- therefor

Signed and Sealed this

Twenty-eighth Day of September, 1999

Attest:

Q. TODD DICKINSON

*Attesting Officer*  *Acting Commissioner of Patents and Trademarks*